(12) United States Patent
Roy et al.

(10) Patent No.: US 10,982,078 B2
(45) Date of Patent: Apr. 20, 2021

(54) DEGRADABLE ELASTOMERIC MATERIAL

(71) Applicant: SCHLUMBERGER TECHNOLOGY CORPORATION, Sugar Land, TX (US)

(72) Inventors: Indranil Roy, Missouri City, TX (US); Gregoire Jacob, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 152 days.

(21) Appl. No.: 15/761,734

(22) PCT Filed: Sep. 20, 2016

(86) PCT No.: PCT/US2016/052577
§ 371 (c)(1),
(2) Date: Mar. 20, 2018

(87) PCT Pub. No.: WO2017/053258
PCT Pub. Date: Mar. 30, 2017

(65) Prior Publication Data
US 2018/0265682 A1  Sep. 20, 2018

Related U.S. Application Data

(60) Provisional application No. 62/221,603, filed on Sep. 21, 2015.

(51) Int. Cl.
| C08L 15/00 | (2006.01) |
| E21B 33/12 | (2006.01) |
| E21B 43/26 | (2006.01) |
| C08K 3/08  | (2006.01) |
| C08K 7/18  | (2006.01) |
| C08L 83/04 | (2006.01) |

(52) U.S. Cl.
CPC .............. *C08L 15/005* (2013.01); *C08K 3/08* (2013.01); *C08K 7/18* (2013.01); *C08L 83/04* (2013.01); *E21B 33/12* (2013.01); *E21B 33/1208* (2013.01); *E21B 43/26* (2013.01); *C08K 2003/0812* (2013.01); *C08K 2003/0825* (2013.01); *C08K 2003/0837* (2013.01); *C08K 2003/0893* (2013.01); *E21B 2200/01* (2020.05)

(58) Field of Classification Search
CPC ......... C08L 15/005; C08L 83/04; C08K 3/08; C08K 7/18; E21B 33/12; E21B 33/1208; E21B 43/26
See application file for complete search history.

(56) References Cited

U.S. PATENT DOCUMENTS

| 8,211,248 B2 | 7/2012 | Marya |
| 8,567,494 B2 | 10/2013 | Rytlewski et al. |
| 2010/0270031 A1 | 10/2010 | Patel |
| 2012/0061096 A1 | 3/2012 | Jensen et al. |
| 2013/0300066 A1 | 11/2013 | Xu et al. |
| 2014/0018489 A1 | 1/2014 | Johnson |
| 2014/0131045 A1* | 5/2014 | Loiseau ............... E21B 43/119 166/305.1 |
| 2015/0129239 A1 | 5/2015 | Richard |
| 2015/0300121 A1 | 10/2015 | Xu |
| 2016/0115368 A1 | 4/2016 | Sadana et al. |
| 2016/0138370 A1 | 5/2016 | Flores et al. |
| 2016/0177655 A1 | 6/2016 | Fripp et al. |
| 2016/0201425 A1 | 7/2016 | Walton et al. |
| 2016/0222752 A1 | 8/2016 | Fripp et al. |
| 2016/0369083 A1 | 12/2016 | Khatiwada et al. |

FOREIGN PATENT DOCUMENTS

WO  2015-077225 A1  5/2015

OTHER PUBLICATIONS

International Search Report and Written Opinion for corresponding PCT Application Serial No. PCT/US2016/052577, dated Jan. 5, 2017, 11 pages.
International Preliminary Report on patentability issued in the PCT Application PCT/US2016/052577, dated Mar. 27, 2018 (7 pages).

* cited by examiner

*Primary Examiner* — Edward J Cain
(74) *Attorney, Agent, or Firm* — Kelly McKinney

(57) ABSTRACT

A method can include polymerizing a blend of materials where the materials include polymeric material and a degradable alloy material; and forming a degradable component from the polymerized blend of materials. Such a method can include exposing the degradable component to water where the degradable alloy material reacts with the water to at least in part degrade the component.

20 Claims, 14 Drawing Sheets

DEGRADABLE ELASTOMERIC MATERIAL

RELATED APPLICATION

This application claims priority to and the benefit of a US Provisional application having Ser. No. 62/221,603, filed 21 Sep. 2015, which is incorporated by reference herein.

BACKGROUND

Various types of materials are used in equipment, operations, etc. for exploration, development and production of resources from geologic environments. For example, equipment may be used in one or more of a sensing operation, a drilling operation, a cementing operation, a fracturing operation, a production operation, etc.

SUMMARY

A method can include polymerizing a blend of materials where the materials include polymeric material and a degradable alloy material; and forming a degradable component from the polymerized blend of materials. As an example, a degradable elastomeric material can include a polymeric matrix and degradable alloy particles. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
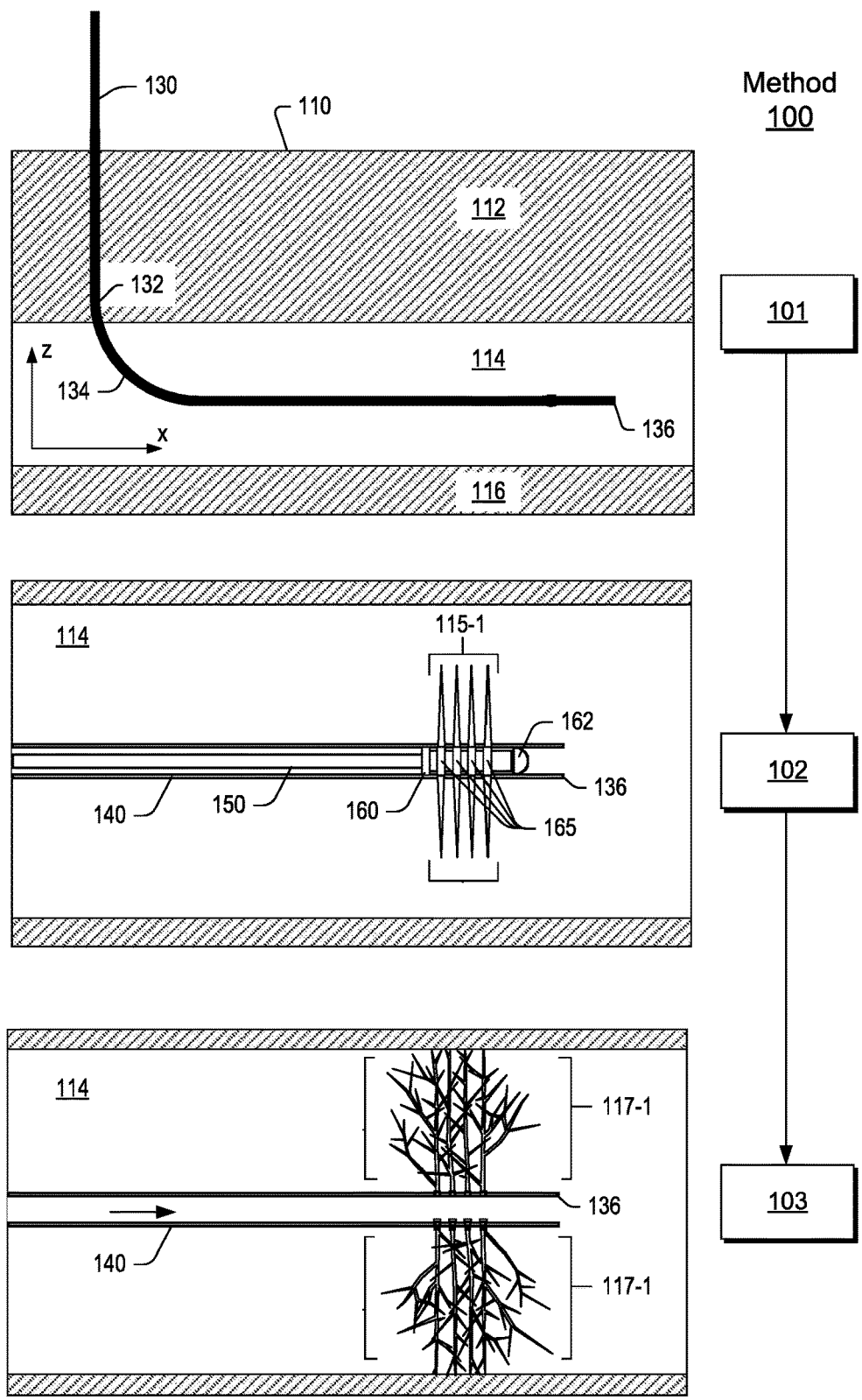
FIGS. 1 and 2 illustrate an example of a method and examples of equipment for fracturing a geologic environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As an example, a material or materials may be processed to form processed material. In such an example, the processed material may be compressed, machined, formed, etc. to produce a part or parts. As an example, a part may be a component or a portion of a component. A part may be included in equipment, which may be suitable for use in an environment such as, for example, a downhole environment. As an example, equipment may be drilling equipment, cementing equipment, fracturing equipment, sampling equipment, or other type of equipment. As an example, equipment may be borehole equipment. As an example, a tool may be a borehole tool, for example, suitable to perform a function or functions in a downhole environment in a borehole.

As to cementing equipment, such equipment may be used in one or more downhole cementing operations. As an example, cement may be placed adjacent to a liner. As an example, a liner may be a string of casing in which the top does not extend to the surface but instead is suspended from inside another casing string. As an example, a liner hanger may be used to attach or hang one or more liners from an internal wall of another casing string.

As an example, a method may include operating one or more components of a liner hanger system. As an example, a lower completion may be a portion of a well that is at least in part in a production zone or an injection zone. As an example, a liner hanger system may be implemented to perform one or more operations associated with a lower completion, for example, including setting one or more components of a lower completion, etc. As an example, a liner hanger system may anchor one or more components of a lower completion to a production casing string.

As an example, equipment may include one or more plugs, one or more seats that can receive a respective plug, etc. In such an example, it may be desirable that a plug and/or a seat have properties suited for one or more operation or operations. Properties may include mechanical properties and may include one or more other types of properties (e.g., chemical, electrical, etc.). As an example, it may be desirable that a plug and/or a seat degrade. For example, a plug and/or a seat may be manufactured with properties such that the plug and/or the seat degrade when exposed to one or more conditions. In such an example, where the plug acts to block a passage, upon degradation, the passage may become unblocked. As an example, a component (e.g., a plug, a seat, etc.) may degrade in a manner that facilitates one or more operations. As an example, a component or a portion of a component may degrade in stages. For example, consider a plug that degrades from a first size to a second smaller size. In such an example, the second smaller size may allow the plug to move (e.g., from a first seat to a second seat, etc.). As an example, a plug tool may be a degradable tool. As an example, a plug tool may be degradable in part. For example, consider a plug tool with a degradable seat or degradable seats. In such an example, a plug may be seated in a degradable seat that upon degradation of the seat, the plug may pass through the seat (e.g., become unplugged with respect to that seat). As an example, a system can include a plug tool that is degradable at least in part and can also include one or more degradable plugs (e.g., balls, cylinders, etc.).

As an example, at least a portion of a borehole tool may be broken via interaction with a tool where at least some of resulting pieces are degradable. For example, a tool may apply force (e.g., drilling force or other force) to a plug, a plug tool, etc. such that the applied forces causes breaking into pieces of at least a portion of the plug, at least a portion of the plug tool, etc. In such an example, the pieces may be relatively large and degrade to relatively small pieces (e.g., which may pass through one or more openings, etc.).

As an example, equipment may include one or more elastomeric components. An elastomer can be defined as being a polymeric material characterized by at least some amount of viscoelasticity (e.g., viscosity and elasticity). As an example, an elastomer can have a relatively low Young's modulus and, for example, a relatively high failure strain compared to various other materials. An example of an elastomer is rubber, which can include vulcanizates.

In an elastomer, monomers can be linked to form a backbone, chains, a network, etc. As an example, an elastomer can include one or more of carbon, hydrogen, oxygen and silicon. For example, consider nitrile rubber, also known as Buna-N, Perbunan, acrylonitrile butadiene rubber, and NBR, which is a synthetic rubber copolymer of acrylonitrile (ACN) and butadiene. Thus, NBR includes a carbon-based backbone (e.g., chains). Nitrile butadiene rubber (NBR) is a family of unsaturated copolymers of 2-propenenitrile and, for example, various butadiene monomers (1,2-butadiene and 1,3-butadiene). NBR tends to be resistant to oil, fuel, and various other chemicals where, as nitrile within the polymer increases, resistance to oils tends to be higher, however, with lower material flexibility.

Another type of rubber is HNBR, which can be formed by reacting NBR with hydrogen. As an example, a process can include producing an emulsion-polymerized NBR, dissolving the NBR in an appropriate solvent and then adding hydrogen gas in conjunction with a precious metal catalyst at a designated temperature and pressure to cause selective hydrogenation that produces HNBR as a "highly saturated nitrile" (HSN) polymer.

As to non-carbon-based backbone elastomers, consider, as an example, polysiloxane with a backbone that includes Si—O—Si units. Polysiloxane tends to be quite flexible due to large bond angles and bond lengths when compared to those found in polymers such as polyethylene. For example, a C—C backbone unit has a bond length of about 1.54 Å and a bond angle of about 112°, whereas a siloxane backbone unit Si—O has a bond length of about 1.63 Å and a bond angle of about 130°.

Polysiloxanes tend to be chemically inert, due to the strength of the silicon-oxygen bond. Despite silicon being a congener of carbon, silicon analogues of carbonaceous compounds generally exhibit different properties, due to the differences in electronic structure and electronegativity between the two elements; the silicon-oxygen bond in polysiloxanes is more stable than the carbon-oxygen bond in polyoxymethylene (a structurally similar polymer) due to its higher bond energy.

Elastomers may be characterized as being amorphous polymeric materials that exist above their glass transition temperature, for example, such that considerable segmental motion is possible. At ambient temperatures, rubbers tend to be relatively soft (e.g., consider a Young's modulus "E" of about 3 MPa) and deformable.

Elastomers may be used, for example, as seals, adhesives, molded flexible parts, etc. As an example, an elastomer may be a damping element, an insulating element, a seal element, etc.

As an example, a seal element may include an elastomer, optionally in addition to one or more other materials. As an example, a component can include a material that is relatively rigid and a material that is elastomeric. For example, consider a component where an elastomer covers at least a portion of a metal or metal alloy structure. In such an example, the elastomer may impart surface properties that can assist with an operation, a function, etc., of a component.

As an example, particles may be added to polymeric material. For example, one or more of carbon nanomaterials including carbon black (CB), carbon nanotubes (CNTs) and graphene may be utilized to alter mechanical, electrical, thermal, barrier, and flame retardant properties of elastomers. Alterations can depend on the molecular nature of a matrix, the intrinsic property, geometry and dispersion of fillers, and interfaces between matrix and fillers.

As an example, carbon black particles may be added to NBR or other polymeric rubbers (e.g., consider use of carbon black as a pigment and reinforcing phase in vehicle tires). While a pure gum vulcanizate of styrene-butadiene has a tensile strength of no more than about 2.5 MPa, and almost nonexistent abrasion resistance, compounding it with about 50 percent of its weight of carbon black improves its tensile strength and wear resistance. As an example, precipitated or fumed silica may be used to reinforce rubber (e.g., alternatively or additionally to carbon black, etc.).

Although the term carbon black is often used in a generic sense, five main types of carbon black include: acetylene black, channel black, lamp black, furnace black and thermal black. Inclusion of carbon black in a nitrile rubber compound can alter structure of the nitrile rubber. As an example, consider inclusion of thermal black N990 (e.g., about 280 nm particle size) in a nitrile rubber compound to modify structure where structure may be characterized as the degree to which a carbon black provides reinforcement to an elastomeric compound and, for example, can be a measurement of particle aggregation. The aforementioned N990 medium thermal carbon black is characterized by relatively large spherical particles that tend to exhibit minimal aggregation. Therefore, N990 tends to be less reinforcing than course furnace carbon blacks which exhibit grape-like aggregates. While medium thermal black may be referred to as an inactive or non-reinforcing black, small particle blacks with higher levels of oxygen and sulfur surface groups tend to be quite active providing high reinforcement to a rubber matrix.

Although similar in microstructure to graphite, carbon layers in carbon black tend to be less ordered, which can result in carbon black being an intrinsic semi-conductive material although the amount of conductivity imparted to a rubber compound also depends on other factors. Primary particle size, structure, porosity, surface oxide groups and loading can play a role in compound conductivity.

Various aforementioned particles tend to be durable and tend to strengthen polymeric materials. For example, carbon black materials can differ in chemical, physical, and structural properties and therefore stability against decomposition, depending on production temperature and carbon black precursor material. Carbon black can be a product of incomplete combustion of vegetation and have a high degree of aromaticity. Carbon black can include an elevated elemental carbon content from condensed aromatic rings, having both microcrystalline graphitic structure as well as amorphous nonorganized structure. With increasing charring temperature, polyaromatic sheets, composed of basic aromatic units, partly stack over each other, forming three-dimensional structures and quite heterogeneous particles. Carbon black stability may depend on chemical forms and micro- and nanostructural physical characteristics. The temperature sensitivity of decomposition may increase with greater recalcitrance.

As an example, particles may be added to a polymeric material where at least a portion of the particles are degradable. For example, degradable particles may be added to polymeric material such that a composite polymeric material is degradable, for example, upon exposure to water.

As an example, a composite polymeric material may include carbon particles (e.g., carbon black, carbon nanotubes, graphene, etc.) and degradable material particles.

As to degradable particles, these can include aluminum as an alloying element in combination with one or more other elements.

As mentioned, equipment may include fracturing equipment where such equipment may be employed to generate one or more fractures in a geologic environment. As an example, a method to generate fractures can include a delivery block for delivering fluid to a subterranean environment, a monitor block for monitoring fluid pressure and a generation block for generating fractures via fluid pressure. As an example, the generation block may include activating one or more fractures. As an example, the generation block may include generating and activating fractures. As an example, activation may occur with respect to a pre-existing feature such as a fault or a fracture. As an example, a pre-existing fracture network may be at least in part activated via a method that includes applying fluid pressure in a subterranean environment. The foregoing method may be referred to as a treatment method or a "treatment". Such a method may include pumping an engineered fluid (e.g., a treatment fluid) at high pressure and rate into a reservoir via one or more bores, for example, to one or more intervals to be treated, which may cause a fracture or fractures to open (e.g., new, pre-existing, etc.).

As an example, a fracture may be defined as including "wings" that extend outwardly from a bore. Such wings may extend away from a bore in opposing directions, for example, according in part to natural stresses within a formation. As an example, proppant may be mixed with a treatment fluid to keep a fracture (or fractures) open when a treatment is complete. Hydraulic fracturing may create high-conductivity communication with an area of a formation and, for example, may bypass damage that may exist in a near-wellbore area. As an example, stimulation treatment may occur in stages. For example, after completing a first stage, data may be acquired and analyzed for planning and/or performance of a subsequent stage.

Size and orientation of a fracture, and the magnitude of the pressure to create it, may be dictated at least in part by a formation's in situ stress field. As an example, a stress field may be defined by three principal compressive stresses, which are oriented perpendicular to each other. The magnitudes and orientations of these three principal stresses may be determined by the tectonic regime in the region and by depth, pore pressure and rock properties, which determine how stress is transmitted and distributed among formations.

Where fluid pressure is monitored, a sudden drop in pressure can indicate fracture initiation of a stimulation treatment, as fluid flows into the fractured formation. As an example, to break rock in a target interval, fracture initiation pressure exceeds a sum of the minimum principal stress plus the tensile strength of the rock. To determine fracture closure pressure, a process may allow pressure to subside until it indicates that a fracture has closed. A fracture reopening pressure may be determined by pressurizing a zone until a leveling of pressure indicates the fracture has reopened. The closure and reopening pressures tend to be controlled by the minimum principal compressive stress (e.g., where induced downhole pressures exceed minimum principal stress to extend fracture length).

After performing fracture initiation, a zone may be pressurized for furthering stimulation treatment. As an example, a zone may be pressurized to a fracture propagation pressure, which is greater than a fracture closure pressure. The difference may be referred to as the net pressure, which represents a sum of frictional pressure drop and fracture-tip resistance to propagation (e.g., further propagation).

As an example, a method may include seismic monitoring during a treatment operation (e.g., to monitor fracture initiation, growth, etc.). For example, as fracturing fluid forces rock to crack and fractures to grow, small fragments of rock break, causing tiny seismic emissions, called microseisms. Equipment may be positioned in a field, in a bore, etc. to sense such emissions and to process acquired data, for example, to locate microseisms in the subsurface (e.g., to locate hypocenters). Information as to direction of fracture growth may allow for actions that can "steer" a fracture into a desired zone(s) or, for example, to halt a treatment before a fracture grows out of an intended zone. Seismic information (e.g., information associated with microseisms) may be used to plan one or more stages of fracturing operations (e.g., location, pressure, etc.).

Figure 2:
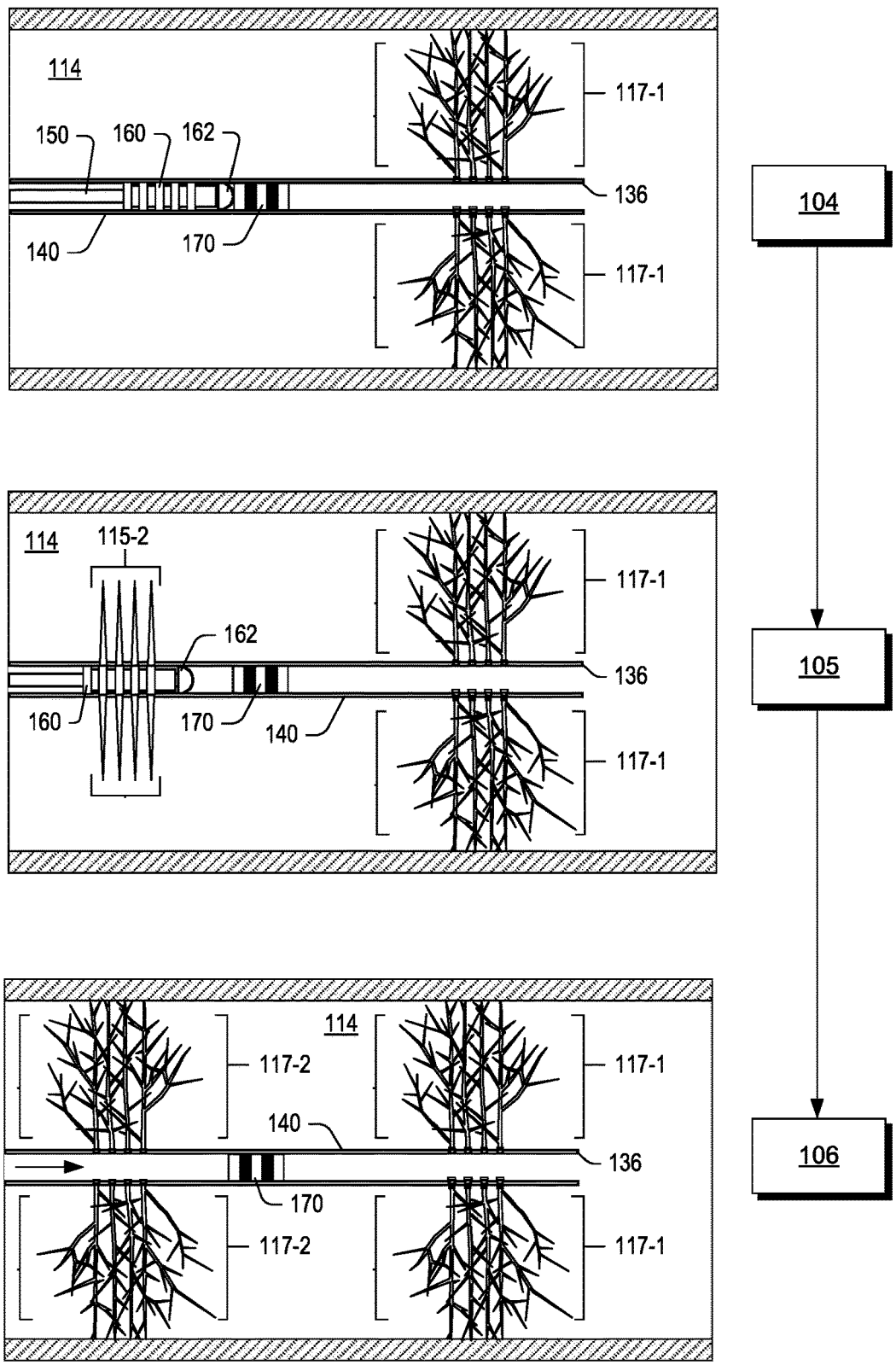

FIGS. 1 and 2 show an example of a method 100 that includes generating fractures. As shown, the method 100 can include various operational blocks such as one or more of the blocks 101, 102, 103, 104, 105 and 106. The block 101 may be a drilling block that includes drilling into a formation 110 that includes layers 112, 114 and 116 to form a bore 130 with a kickoff 132 to a portion defined by a heel 134 and a toe 136, for example, within the layer 114.

As illustrated with respect to the block 102, the bore 130 may be at least partially cased with casing 140 into which a string or line 150 may be introduced that carries a perforator 160. As shown, the perforator 160 can include a distal end 162 and charge positions 165 associated with activatable charges that can perforate the casing 140 and form channels 115-1 in the layer 114. Next, per the block 103, fluid may be introduced into the bore 130 between the heel 134 and the toe 136 where the fluid passes through the perforations in the casing 140 and into the channels 115-1. Where such fluid is under pressure, the pressure may be sufficient to fracture the layer 114, for example, to form fractures 117-1. In the block 103, the fractures 117-1 may be first stage fractures, for example, of a multistage fracturing operation.

Per the block 104, additional operations are performed for further fracturing of the layer 114. For example, a plug 170 may be introduced into the bore 130 between the heel 134 and the toe 136 and positioned, for example, in a region between first stage perforations of the casing 140 and the heel 134. Per the block 105, the perforator 160 may be activated to form additional perforations in the casing 140 (e.g., second stage perforations) as well as channels 115-2 in the layer 114 (e.g., second stage channels). Per the block 106, fluid may be introduced while the plug 170 is disposed in the bore 130, for example, to isolate a portion of the bore 130 such that fluid pressure may build to a level sufficient to form fractures 117-2 in the layer 114 (e.g., second stage fractures).

In a method such as the method 100 of FIGS. 1 and 2, it may be desirable that a plug (e.g., the plug 170) includes properties suited to one or more operations. Properties of a plug may include mechanical properties (e.g., sufficient strength to withstand pressure associated with fracture generation, etc.) and may include one or more other types of properties (e.g., chemical, electrical, etc.). As an example, it may be desirable that a plug degrades, that a plug seat degrades, that at least a portion of a borehole tool degrades, etc. For example, a plug may be manufactured with properties such that the plug withstands, for a period of time, conditions associated with an operation and then degrades (e.g., when exposed to one or more conditions). In such an example, where the plug acts to block a passage for an operation, upon degradation, the passage may become unblocked, which may allow for one or more subsequent operations.

Figure 11:
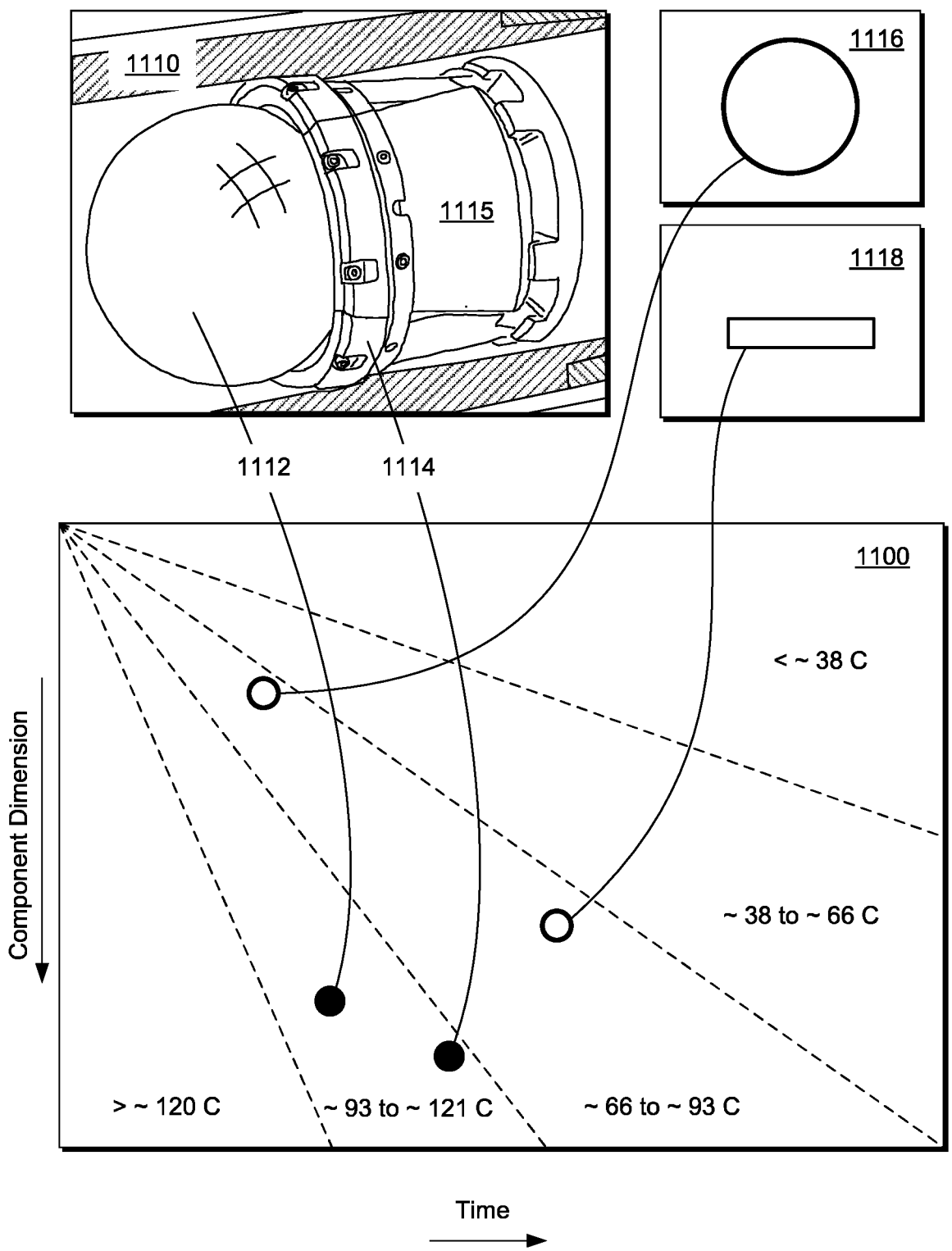
FIG. 11 illustrates an example of a plot of a component parameter versus degradation time, an example of an assembly and examples of components.

As an example, a component may be degradable upon contact with a fluid such as an aqueous ionic fluid (e.g., saline fluid, etc.). As an example, a component may be degradable upon contact with well fluid that includes water (e.g., consider well fluid that includes oil and water, etc.). As an example, a component may be degradable upon contact with a fracturing fluid (e.g., a hydraulic fracturing fluid). FIG. 11 shows an example plot 1100 of degradation time versus a component dimension for various temperatures where a component is in contact with a fluid that is at least in part aqueous (e.g., include water as a medium, a solvent, a phase, etc.).

Figure 3:
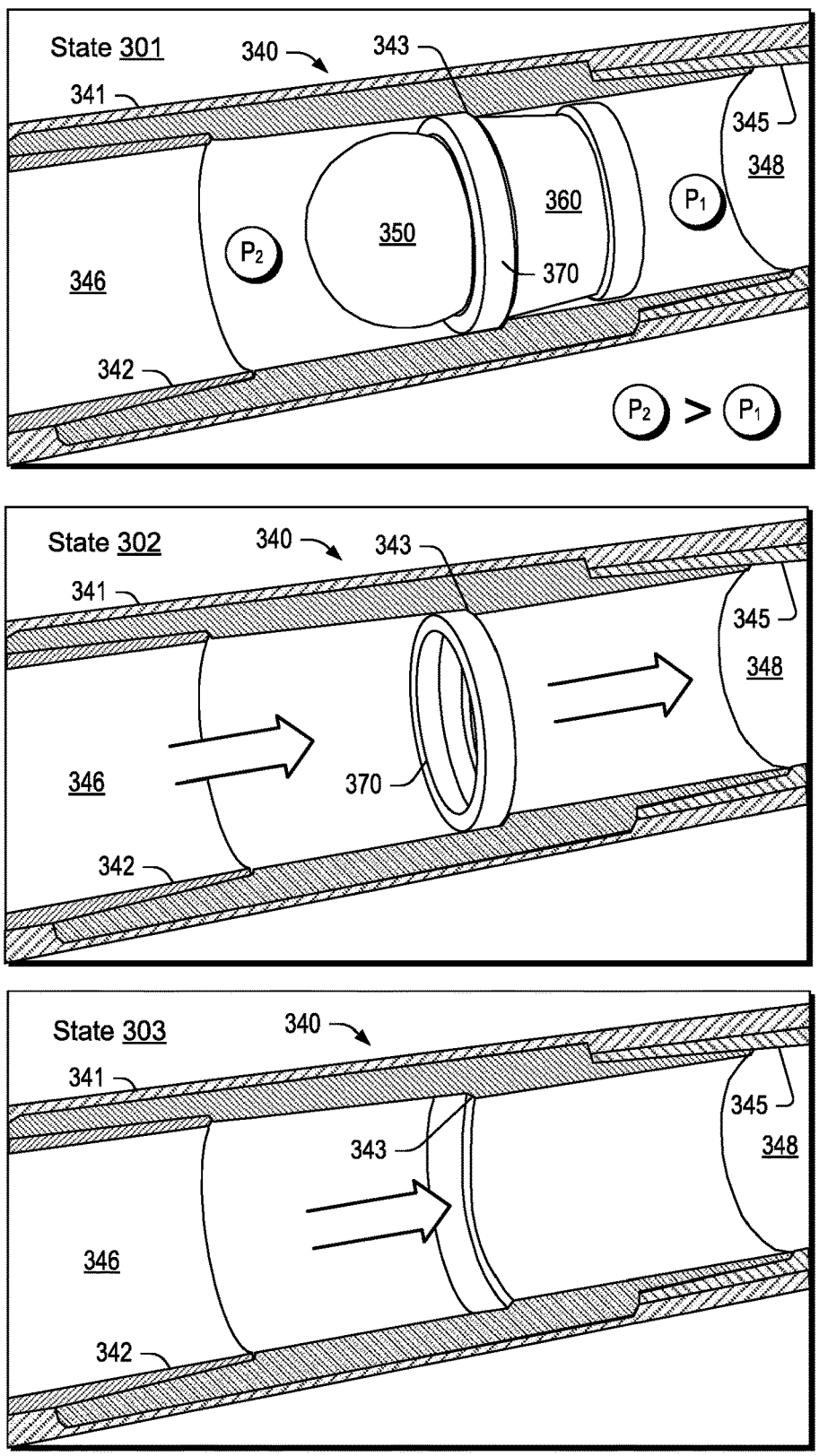
FIG. 3 illustrates an example of equipment in various example operational states.

FIG. 3 shows an example of equipment in various states 301, 302 and 303. As shown, the equipment can include a casing 340 that include various components 341, 342, 343 and 345. For example, the component 342 may define a bore 346 and the component 345 may define a bore 348 where the component 343 includes features (e.g., reduced diameter, conical shape, receptacle, etc.) that can catch a ring component 370 that is operatively coupled to a plug component 360 where the ring component 370 and the plug component 360 may position and seat a plug 350 in the casing 340. As an example, a seal may be formed by the plug 350 with respect to the plug component 360 and/or the ring component 370 and, for example, a seal may be formed by the ring component 370 with respect to the component 343. In such an approach, the seals may be formed in part via fluid pressure in a manner where increased pressure acts to increase seal integrity (e.g., reduce clearances that may be subject to leakage). As an example, the ring component 370 may be an upper component (e.g., a proximal component) of a plug seat and the plug component 360 may be a lower component (e.g., a distal component) of the plug seat.

As shown in the state 301, the plug 350 may be seated such that the bore 346 (e.g., of a first zone) is separated (e.g., isolated) from the bore 348 (e.g., of a second zone) such that fluid pressure in the bore 346 (see, e.g., $P_2$) may be increased to a level beyond fluid pressure in the bore 348 (see, e.g., $P_1$). Where the plug 350 and the plug component 360 are degradable, for example, upon contact with fluid that may pressurize the bore 348, degradation of the plug 350 and the plug component 360 may transition the equipment from the state 301 to the state 302. As shown in the state 302, fluid may pass from the bore 346 to the bore 348, for example, via an opening of the ring component 370. Where the ring component 370 is degradable, for example, upon contact with fluid in the bore 346, degradation of the ring component 370 may transition the equipment from the state 302 to the state 303. In the state 303, the casing 340 may be the remaining equipment of the state 301 (e.g., the plug 350, the plug component 360 and the ring component 370 are at least in part degraded).

As an example, the plug 350, the plug component 360 and the ring component 370 may be components of a dissolvable plug and perforation system that may be used to isolate zones during stimulation (see, e.g., the method 100 of FIGS. 1 and 2). Such equipment may be implemented in, for example, cemented, uncemented, vertical, deviated, or horizontal bores (e.g., in shale, sandstone, dolomite, etc.).

As an example, the plug component 360 and the ring component 370 may be conveyed in a bore via a pump down operation (e.g., which may move the components 360 and 370 along a bore axis direction). As an example, a component or components may include adjustable features, for example, that allow a change in diameter to facilitate seating in a receptacle disposed in a bore. For example, a tool may interact with a component or components to cause a change in diameter or diameters (e.g., a change in form of one or more components). In the changed state, the component or components may catch and seat in a receptacle disposed in a bore (e.g., seat in a shoulder of a receptacle component).

As an example, the plug component 360 and the ring component 370 may be seated in a receptacle by a tool that may include one or more perforators. Once seated, the tool may be repositioned to perforate casing and form channels (e.g., in a layer or layers of rock). As an example, repositioning may occur multiple times, for example, to form multiple sets of perforations and multiple sets of channels. As an example, after perforating and channel formation, the plug 350 may be pumped down to contact the plug component 360 and/or the ring component 370, for example, to form a seal that can isolate one zone from another zone (e.g., one interval from another interval). Fluid pressure may be increased in an isolated zone as defined by the plug 350, the plug component 360 and the ring component 370 as positioned in a receptacle disposed in a bore such that the fluid enters channels via perforations of the isolated zone and generates fractures (e.g., new fractures, reactivated fractures, etc.).

In the example method 100 shown in FIGS. 1 and 2, one or more degradable elastomeric materials may be employed. For example, consider one or more of the plug 350, the plug component 360 and the ring component 370 as including a degradable elastomeric material. In such an example, the ring component 370 may include a degradable elastomeric material coating that can enhance sealing with respect to one or more other components. As an example, the plug component 360 may be made of a plurality of parts where one or more interfaces between two or more of the parts may include a degradable elastomeric material.

As an example, a degradable elastomeric material may be configured as an O-ring or other type of seal ring or seal element. As an example, a degradable O-ring may degrade in a manner that allows for disruption of a seal such that fluid can penetrate a component, adjoining parts, etc. Where such a component, adjoining parts, etc., are degradable, intrusion of fluid (e.g., well fluid, hydraulic fracturing fluid, water, etc.) may causes degradation thereof.

Figure 4:
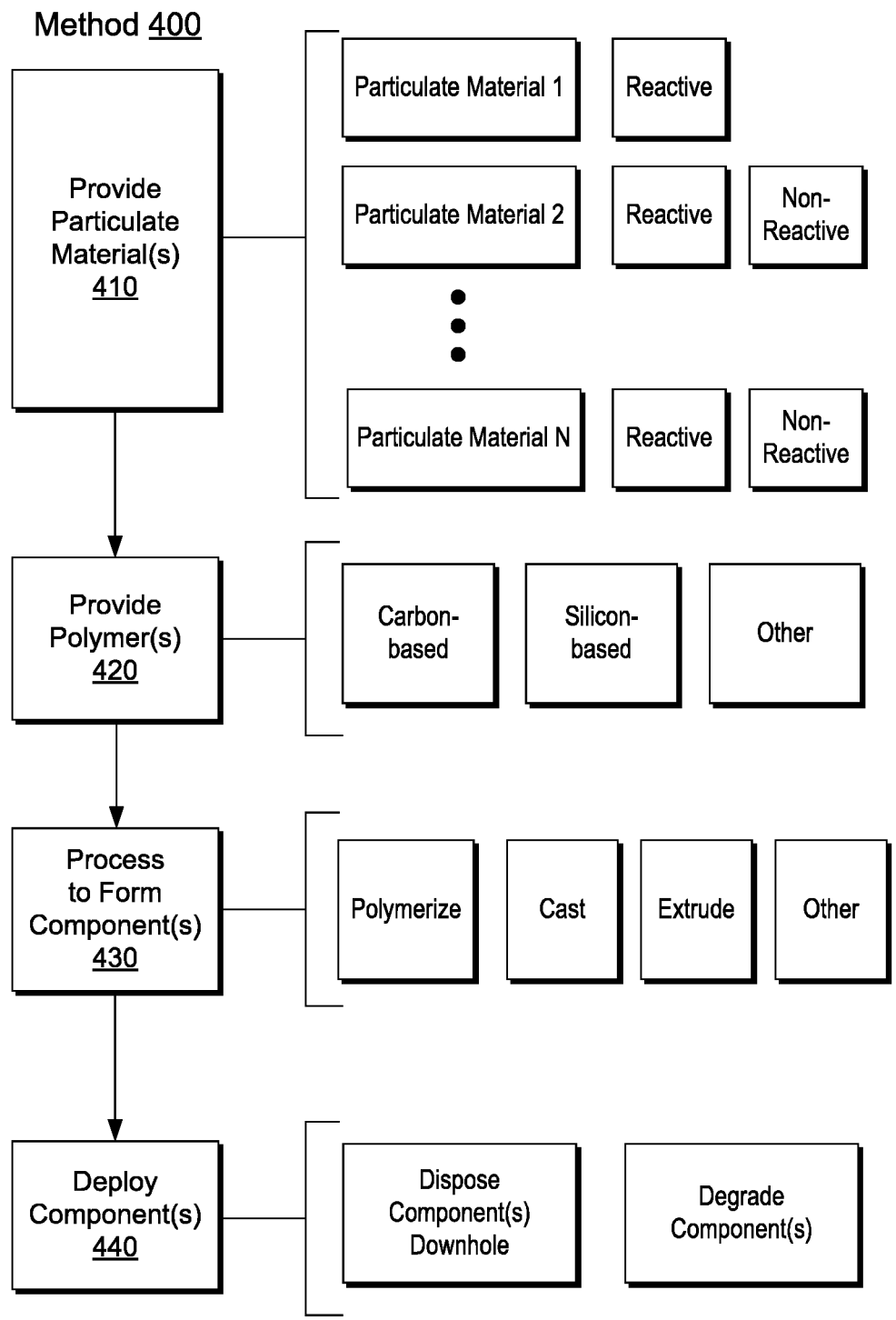
FIG. 4 illustrates an example of a method.

FIG. 4 shows an example of a method 400 that includes a provision block 410 for providing one or more particulate materials, a provision block 420 for providing one or more polymeric materials, a process block 430 for processing materials to form one or more components and a deployment block 440 for deploying one or more components, for example, as formed per the process block 430 and optionally one or more additional components.

As shown in FIG. 4, the provision block 410 can include providing one or more different types of particulate materials where at least one of the particulate materials is reactive in that it can degrade (e.g., degrade in an aqueous solution). As an example, one or more of the particulate materials may be produced by and/or subjected to one or more severe plastic deformation (SPD) processes. As an example, a material may be processed via cryomilling as an SPD process.

As an example, particulate material may be substantially spherical. For example, particulate material made from gas atomization may be substantially spherical. Such particulate material may enhance "packing" of such material within a polymeric matrix. As an example, a combination of different particle size distribution populations may be introduced into polymeric material and polymerized to form a degradable elastomeric material.

As an example, particulate material may be screened. For example, consider screening to "filter" out sub-micron sized particles, which may be substantially spherical (e.g., as produced via gas atomization). A degradable elastomeric material may be characterized by a "packing" factor (e.g., packing fraction, etc.) as to degradable alloy material particles. As an example, a polymeric material may be about 20 percent by volume and degradable alloy material particles may be about 80 percent by volume. Such a percentage of degradable alloy material particles may be achieved via size(s) and shape (e.g., substantially spherical, etc.).

As an example, a model may consider multimodal packing. For example, consider voids of larger particles packed with smaller particles, whose voids in turn may optionally be filled with even smaller particles, etc. (e.g., a form of geometrical progression). As an example, a population of particles with a progressive particle size distribution (PSD) may be separated into populations or, for example, separate populations of particles may be combined to form a progressive PSD (e.g., optionally a continuous PSD such as a power law PSD). As an example, a PSD may be Gaussian or another type of mathematical/statistical distribution.

As an example, a packing of particles may be characterized as a disordered packing. As an example, a so-called random loose packing (RLP) may have, for uniform spheres, a packing fraction in the limit of zero gravity of about 0.44 (e.g., void fraction of about 0.56); whereas, a so-called random close packing (RCP) may have, for uniform spheres, a packing fraction of about 0.64 (e.g., void fraction of about 0.36). RCP may be considered by some to be mathematically ill-defined and rather referred to as, for example, "maximally random jammed". As to RLP, it may be considered by some to be very loose random packing, for example, as achieved by spheres slowly settling.

As shown in FIG. 4, the provision block 420 can include providing one or more different types of polymeric materials. As an example, a polymeric material may be considered to be carbon-based, silicon-based or based on another element or elements that can form a backbone.

As shown in FIG. 4, the process block 430 can include one or more processes that can form a component. For example, consider a casting process, an extrusion process, a polymerization process (e.g., a vulcanization process, etc.), heat ageing, etc.

As an example, a component may include a relatively smooth surface and, upon cutting, a relatively rough surface. For example, roughness (e.g., in cross-section) may be imparted via inclusion of one or more particulate materials.

As an example, a component may be a seal element such as, for example, a gasket, an O-ring, etc. As an example, a seal element may be formed from stock such as a cord with a particular cross-sectional shape, a film, etc. As an example, a cord may be shaped and joined substantially end-to-end to form a contiguous component (e.g., an O-ring). As an example, a film may be cut (e.g., laser, water jet, stamping, etc.) to form a component such as, for example, a gasket.

As an example, a tool may include one or more grooves, channels, passages, etc., that may be at least partially filled with one or more degradable elastomeric materials. In such an example, degradation may open a groove, a channel, a passage, etc. to flow of fluid (e.g., liquid and/or gas, optionally entraining solids, etc.).

As shown in FIG. 4, the deployment block 440 can include disposing one or more components in a downhole environment and degrading at least a portion of one of the one or more components in the downhole environment. As an example, the deployment block 440 may also include ageing of one or more components in an environment or environments in which a component or components may be deployed. As an example, ageing can include heat treating.

As an example, a degradable polymeric material can be a water-reactive polymeric material that is elastomeric and that breaks down in aqueous fluids (e.g., dissolves and disintegrates into powder form, etc.). For example, a degradable polymeric material can include water reactive material that is within a polymeric matrix where exposure to water causes the water reactive material to generate hydrogen, which, as a gas, may migrate via pressure build-up through the polymeric matrix and thereby break polymeric bonds. As an example, a degradable polymeric material can be formed to have a defined strength and, for example, a defined elongation to failure in one or more environments (e.g., ambient to high pressure), which can enable them to perform as a seal material prior to break down.

As an example, reactivity of a degradable polymeric material can be tailored by addition of one or more catalytic materials, which can include, for example, metallic powder forms with distinct particle size distributions.

As an example, one or more degradable polymeric components may be implemented in one or more tools, pieces of equipment, etc., for example, to achieve temporary sealing (e.g., static and/or dynamic). As an example, an operation that performs multistage stimulation may employ one or more degradable elastomeric sealing elements, optionally as triggering components. For example, degradation of a seal element may trigger degradation or expedite degradation of one or more other components.

As an example, a degradable polymeric material may degrade upon exposure to brine (e.g., a selected brine or brine in a range from a dilute brine to a saturated brine). As an example, a degradable polymeric material may degrade upon exposure to water. As an example, an environment that includes brine, water, etc. may be under ambient or other conditions (e.g., consider high pressure and high temperature conditions). As an example, a target duration to breakdown and dissolution may be of the order of a day to months, for example, consider a target duration that is within a range from about 15 days to about 3 months.

Figure 5:
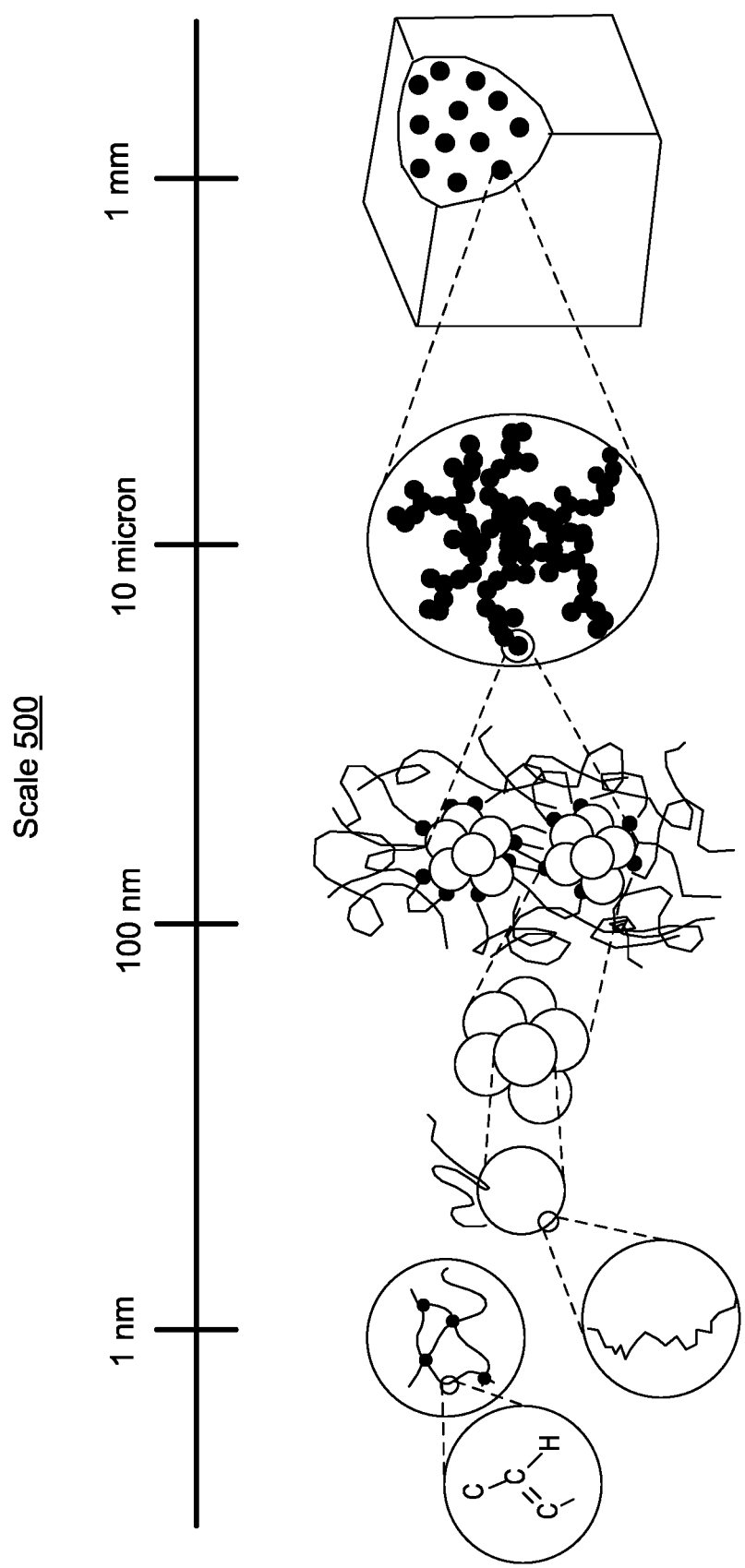
FIG. 5 illustrates an example scale with respect to various structures.

FIG. 5 shows an example scale 500 with respect to examples of structures. As shown, the scale 500 extends from about 1 nm to about 1 mm. The various structures include polymeric material and particles characteristic of carbon black in rubber.

As an example, degradable particles added to polymeric material may be characterized by particle size. For example, consider a particle size profile as follows: D90, about 50 microns to about 80 microns, target less than about 70 microns; D50, about 10 microns to about 30 microns, target less than about 18 microns; D10, about 1 micron to about 8 microns, target less than about 5 microns.

As an example, a method can include mixing a polymeric material with one or more ingredients to form a blend. For example, consider one or more of carbon black, silica, a peroxide curing agent, anti-oxidants, etc. As an example, such a polymeric material may be defined by its polymeric material viscosity and, for example, via one or more ingredients, its strength. For example, consider adding carbon black, silica, etc. to augment strength. As an example, sizes of additives may be selected to achieve desired properties.

A blend may then be mixed with a degradable powder and polymerized. For example, vulcanization may be performed according to a temperature and time schedule. As an example, consider disposing the degradable powder blend in a mold, heating to about 320 degrees F. to about 350 degrees F. (e.g., about 160 degrees C. to about 177 degrees C.). As an example, pressure may be applied to assist curing and/or shaping. As an example, a sulfur cure may facilitate activating and cross-linking polymeric chains.

As an example, a method can include selecting a time, a temperature and a pressure for curing a polymeric blend that includes degradable material. As an example, one or more of a time schedule, a temperature schedule and a pressure schedule may be selected and implemented to polymerize material that includes degradable material (e.g., degradable powder). Such parameters, schedules, etc., may determine an amount of cross-linking, a speed of cross-linking, etc.

As an example, a blend of polymeric material and degradable powder may be flowable. For example, such a blend may be pourable to pour into a mold, etc. As an example, a blend may be extrudable, optionally extrudable over an object (e.g., a core, etc.). As an example, a multilayered object may be formed where at least one layer of the multilayered object includes a degradable polymeric material (e.g., an elastomer that forms a matrix that includes degradable powder within the matrix, etc.).

Figure 6:
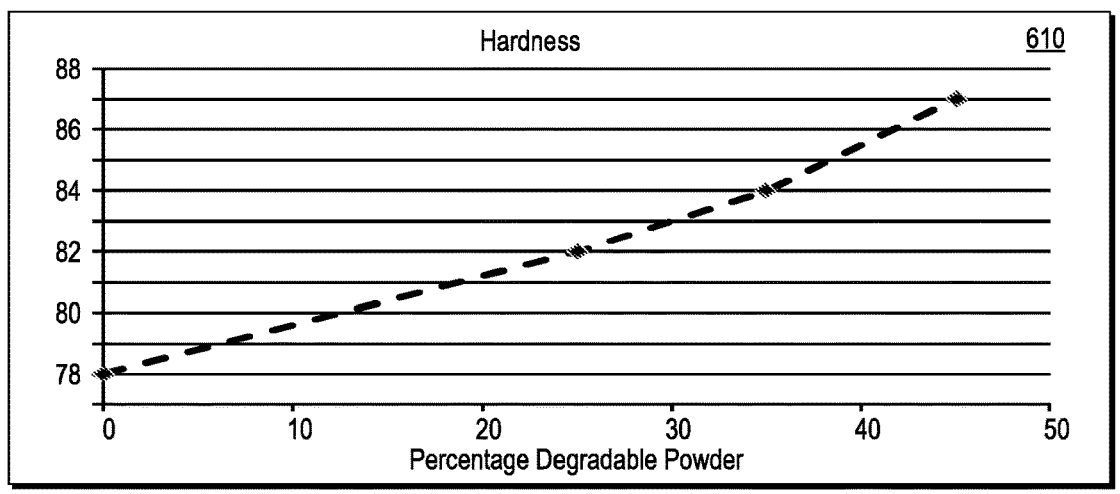
FIG. 6 illustrates examples of plots.
Figure 6:
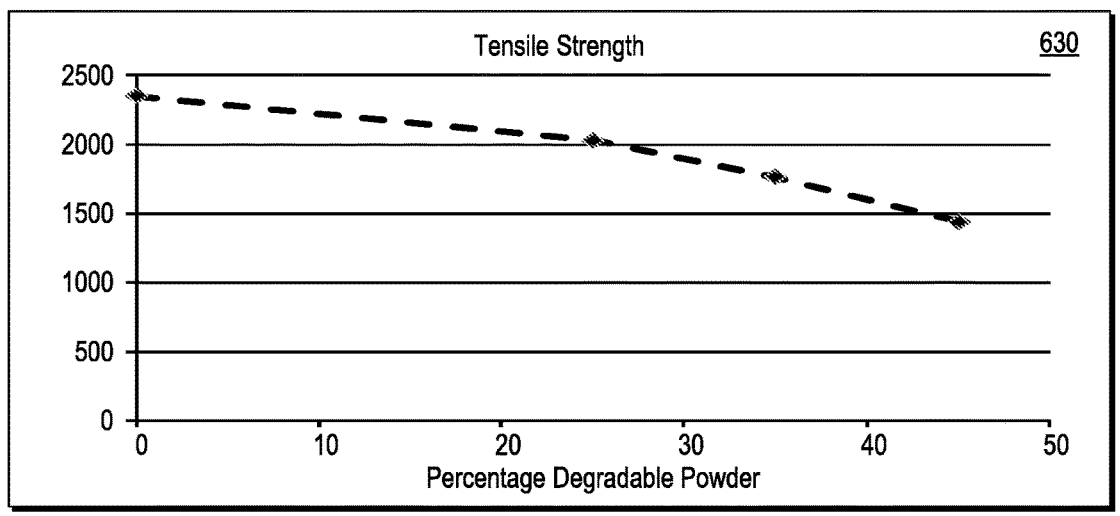
Figure 6:
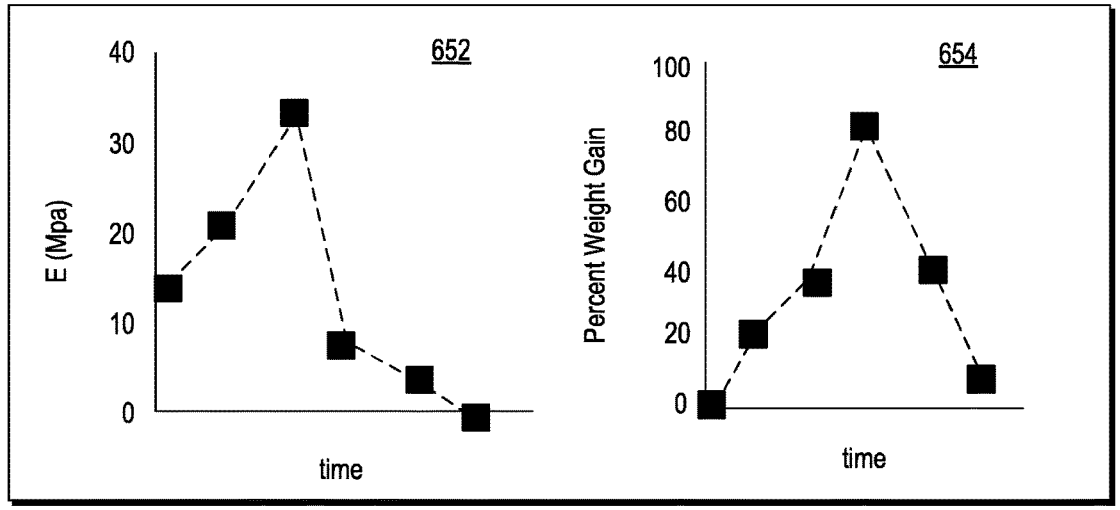

FIG. 6 shows example plots 610 and 630 of hardness versus percentage degradable powder in a polymeric material that includes NBR and of tensile strength versus percentage degradable powder in a polymeric material that includes NBR, respectively. FIG. 6 also shows plots 652 and 654 of Young's modulus (E) and percent weight gain with respect to time upon exposure of a degradable elastomeric material (e.g., silicon-based elastomer and degradable aluminum-based alloy) to an aqueous environment (e.g., water).

As shown in the plot 610, hardness increases with respect to increasing percentage of degradable powder (e.g., from about 0 percent to about 45 percent by weight) and tensile strength decreases with respect to increasing percentage of degradable powder (e.g., from about 0 percent to about 45 percent weight). The plot 610 shows about 12 percent increase in hardness while the plot 630 shows about a 40 percent decrease in tensile strength.

Table 1, below, shows hardness and tensile strength for about 45 percent by weight of degradable powder in a polymeric material that includes silicone (e.g., 70 duro silicone). As shown, inclusion of degradable powder at about 45 percent by weight increases hardness and decreases tensile strength.

|  | Control | 45 Percent |
| --- | --- | --- |
| Hardness | 75 | 89 |
| Tensile Strength (PSI) | 1170.6 | 486.1 |

In the examples of FIG. 6 and Table 1, the degradable powder included a degradable aluminum alloy. As an example, a degradable powder may be in a range of about 1 percent to about 99 percent by weight in a polymeric material (e.g., in a polymeric matrix). As an example, a degradable powder may be in a range of about 1 percent to about 80 percent by weight in a polymeric material (e.g., in a polymeric matrix). As an example, a degradable powder may be in a range of about 5 percent to about 50 percent by weight in a polymeric material (e.g., in a polymeric matrix).

As an example, a degradable elastomeric material may be characterized by its Young's modulus. For example, consider a degradable elastomeric material with a Young's modulus of the order of about 10 MPa where, upon exposure to water, the Young's modulus increases as the material swells, as part of a degradation process (e.g., via generation of hydrogen and migration of hydrogen, etc.). For example, a Young's modulus may increase from about 10 MPa to about 35 MPa or more during degradation (e.g., dissolution). An example of such a transition with respect to time is illustrated in the data of the plot 652 of FIG. 6.

As an example, once a degradable alloy material (e.g., powder or particulate material) of a degradable elastomeric material reacts with water, as it diffuses into the polymeric matrix of the degradable elastomeric material, hydroxides may be formed and hydrogen gas may be formed as well, which may form "bubbles" that seek egress from the degradable elastomeric material. Hydroxides and hydrogen can contribute to swelling and an increase in Young's modulus before a decrease and dissolution. As shown in the example plot 652, stiffening can occur followed by dissolution. A stiff material demands more force to deform compared to a soft material; thus, Young's modulus can be a measure of the stiffness of a solid material.

As an example, egress of hydrogen may cause some amount of swelling of a degradable elastomeric material upon exposure to water. As an example, a maximum weight gain may occur over a duration of the order of days (e.g., about 10 days). An example of such a transition with respect to time is illustrated in the data of the plot 654 of FIG. 6.

As an example, upon exposure to water (e.g., saline solution, etc.), a Young's modulus of a degradable elastomeric material may decrease to approximately zero after a duration of days (e.g., about 15 days or more). As an example, upon exposure to water (e.g., saline solution, etc.), a degradable elastomeric material may break down into a powdery material (e.g., a powdery "solid", etc.) after a duration of days (e.g., about 15 days or more).

As an example, a degradable alloy material may be characterized by density and polymeric material may be characterized by density. As an example, a degradable alloy material may be of a density of the order of about 0.1 pounds per inch cubed (e.g., about 2.7 g/cm$^3$). As an example, for a silicon-based polymeric matrix (e.g., a density of about 1.4 g/cm$^3$), with such degradable alloy material at about 45 percent by weight, a density of a degradable elastomeric material may be about 1.79 g/cm$^3$.

As an example, a polymeric material may be or include one or more of silicone, NBR, HNBR, ethylene propylene diene monomer (M-class) rubber (EPDM), polychloroprene (e.g., neoprene), Viton A (dipolymers of VF2/HFP), Viton B (terpolymers of VF2/HFP/TFE), Viton F (terpolymers of VF2/HFP/TFE), a Viton specialty types (e.g., GLT, GBLT, GFLT, copolymers of TFE/propylene and ethylene/TFE/PMVE, etc.), etc. As an example, a polymeric material may be formed of a mixture of different types of polymers.

As an example, a polymeric material may be a thermoplastic elastomeric material (e.g., a thermoplastic rubber). For example, consider a class of copolymers or a physical mix of polymers (e.g., a plastic and a rubber) that include materials with thermoplastic and elastomeric properties.

Thermoplastic elastomers (TPE), sometimes referred to as thermoplastic rubbers, are a class of copolymers or a physical mix of polymers (e.g., consider a plastic and a rubber) that include materials with thermoplastic and elastomeric properties. As an example, a difference between thermoset elastomers and thermoplastic elastomers can be characterized via type of cross-linking bonds in their structures.

TPEs can include, for example, styrenic block copolymers (TPE-s), thermoplastic olefins (TPE-o), elastomeric alloys (TPE-v or TPV), thermoplastic polyurethanes (TPU), thermoplastic copolyester, and thermoplastic polyamides As an example, an environment in which one or more components are deployed may be a harsh environment, for example, an environment that may be classified as being a high-pressure and high-temperature environment (HPHT). A so-called HPHT environment may include pressures up to about 138 MPa (e.g., about 20,000 psi) and temperatures up to about 205 degrees C. (e.g., about 400 degrees F. and about 480 K), a so-called ultra-HPHT environment may include pressures up to about 241 MPa (e.g., about 35,000 psi) and temperatures up to about 260 degrees C. (e.g., about 500 degrees F. and about 530 K) and a so-called HPHT-hc environment may include pressures greater than about 241 MPa (e.g., about 35,000 psi) and temperatures greater than about 260 degrees C. (e.g., about 500 degrees F. and about 530 K). As an example, an environment may be classified based in one of the aforementioned classes based on pressure or temperature alone. As an example, an environment may have its pressure and/or temperature elevated, for example, through use of equipment, techniques, etc. For example, a SAGD operation may elevate temperature of an environment (e.g., by 100 degrees C. or more; about 370 K or more).

As mentioned, a degradable polymeric material can include a polymeric matrix that includes particular material within the matrix. As mentioned, particular material can be degradable in a manner that causes a polymeric matrix to stiff, swell and then dissolve. For example, the plot 652 of FIG. 6 shows an increase in Young's modulus of a degradable polymeric material followed by a decrease in Young's modulus while the plot 654 of FIG. 6 shows an increase in weight of a degradable polymeric material followed by a decrease in weight. As an example, a degradable polymeric material may be characterized by behavior as illustrated in the plot 652 and/or as illustrated in the plot 654.

As an example, a particulate material, suitable for inclusion in a polymeric matrix to form a degradable polymeric material, may be a powder. As an example, a powder may be defined as a dry, bulk solid composed of a number of particles that may, for example, flow relatively freely when shaken, tilted, etc. As an example, a powder may be a sub-class of a granular material. As an example, a particulate material may be a flowable material (e.g., flow relatively freely when shaken, tilted, etc.).

As an example, a particulate material such as, for example, a powder, may be characterized by one or more properties, parameters, dimensions, etc. As an example, a particulate material may be characterized by one or more particle sizes. Where a particle is spherical, the particle may be quantitatively defined by its diameter (e.g., or radius). Where a particle has an irregular shape that is not-spherical, a dimension may be defined by a diameter corresponding to the volume of the particle as equated to the volume of a sphere. As an example, a particle may be ellipsoidal and, for example, defined by a major axis length and/or a minor axis length.

As an example, a particle may include a shape other than spherical, ellipsoidal, etc. As an example, consider needle or rod shaped particles that may be characterized at least in part by an aspect ratio of a longest dimension to a shortest dimension (e.g., consider an aspect ratio of about 5 to 1 or more). As another example, consider plate or platelet shape particles, which may be characterized at least in part by planar dimensions and a thickness dimension.

As an example, particulate matter may be characterized at least in part by one or more of a particle population mean as an average size of a population of particles, a particle population median as a size where approximately 50 percent of the population is below and approximately 50 percent is above, and a particle population mode or modes, for example, a size with highest frequency.

As an example, particulate material may include particles that are substantially spherical in shape (e.g., optionally characterized by sphericity). In such an example, a particle may be characterized by a particle size that corresponds to a diameter (e.g., assuming spherical shape). As an example, a powder may include particles with corresponding particle sizes that are within a range of less than about 100 microns and greater than about 10 microns.

As an example, particles may include crystalline structures, for example, a particle may be greater than about 80 weight percent crystalline. In such an example, a particle may include an amorphous structure, for example, a particle may be less than about 20 weight percent amorphous and greater than about 80 weight percent crystalline.

Crystals tend to have relatively sharp, melting points as component atoms, molecules, or ions tend to be ordered with regularity (e.g., with respect to neighbors). An amorphous solid can exhibit particular characteristics, for example, upon cleaving or breaking, an amorphous solid tends to produce fragments with irregular surfaces and an amorphous solid tends to exhibit poorly defined patterns in X-ray imaging. An amorphous, translucent solid may be referred to as a glass.

Various types of materials may solidify into an amorphous form where, for example, a liquid phase is cooled with sufficient rapidity. Various solids may be intrinsically amorphous, for example, because atoms do not fit together with sufficient regularity to form a crystalline lattice or because impurities disrupt formation of a crystalline lattice. For example, although the chemical composition and the basic structural units of a quartz crystal and quartz glass are the same (e.g., $SiO_2$ and linked $SiO_4$ tetrahedra), arrangements of atoms in space are not. Crystalline quartz includes an ordered arrangement of silicon and oxygen atoms; whereas, in quartz glass, atoms are arranged relatively randomly. As an example, when molten $SiO_2$ is cooled rapidly (e.g., at a rate of about 4 K/min), it can form quartz glass; whereas, large quartz crystals (e.g., of the order of a centimeter or more) may have had cooling times of the order of years (e.g., thousands of years).

Aluminum crystallizes relatively rapidly; whereas, amorphous aluminum may form when liquid aluminum is cooled at a rate of, for example, about $4 \times 10^{13}$ K/s. Thus, cooling rate of aluminum can determine how atoms arrange themselves (e.g., regularly or irregularly).

As an example, a particle may be polycrystalline, for example, composed of crystallites (e.g., grains) that can vary in size and orientation. As an example, grain size may be determined using a technique such as X-ray diffraction, transmission electron microscopy, etc.

A grain boundary may be defined as the interface between two grains in a polycrystalline material. Grain boundaries, defects in crystal structure, tend to decrease electrical and thermal conductivity of material. Grain boundaries may be sites for precipitation of one or more phases, which may be referred to as grain boundary material. Grain boundaries may disrupt motion of dislocations through a material. As an example, reduction of grain size may improve strength, for example, as described by the Hall-Petch relationship.

As an example, grain boundaries may meet at a so-called grain boundary triple point (GBTP). At a GBTP (e.g., a volumetric space), a phase or phases (e.g., of grain boundary material) may exist that differ from that of crystalline material in a grain.

As an example, a powder may include particles that include grain sizes of less than about 2 microns. As an example, grain sizes may be less than about 1 micron. As an example, average grain sizes may be less than about 0.5 microns (e.g., less than about 500 nm). As an example, average grain sizes may be less than about 200 nm. As an example, material that exists between grains may be of a dimension of an order of tens of nanometers to an order of hundreds of nanometers. As an example, material that exists between grains may be of a dimension that is less than an average grain size. For example, consider grains with an average grain size of the order of hundreds of nanometers and grain boundary material with an inter-grain spacing dimension of the order of tens of nanometers.

As an example, a powder particle may include grains that include one or more materials at their boundaries. For example, a grain may be bound by a select material at its boundaries. As an example, a grain boundary material may coat a grain such that the grain is substantially encapsulated by the grain boundary material. As an example, a grain boundary material may be described as "wetting" a grain, for example, a grain boundary material may be continuous and wet an entire surface (e.g., boundary) of a grain. As an example, a particle can include grains that are in a continuum of a grain boundary material. In such an example, the grains may be spaced from each other by the grain boundary material. As an example, a size of the boundary (or the spacing between grains) may be of the order of tens of nanometers to hundreds of nanometers. The spacing between grains (e.g., the size of the grain boundary) may be determined at least in part based on the surface tension of the grain boundary material and the grain. Thus, for example, spacing may vary depending on the material in the grain boundary and the material of the grain. As an example, strength of a powder particle may be approximated at least in part by a relationship such as, for example: $\propto 1/\sqrt{\bar{d}}$, where $\bar{d}$ is the average grain size and $\sigma$ is the energy of the grain boundary.

As an example, to form a continuous grain boundary, a boundary forming component of a melt may be greater than about two percent by weight. For example, consider a melt of an aluminum alloy and gallium where the gallium is present at a weight percent greater than about two percent and less than about 20 percent (e.g., optionally less than about 10 percent, and in some examples less than about five percent). In such an example, atomization of the melt can form particles with grains that reside in a continuum of grain boundary material that includes gallium (e.g., a substantially continuous boundary material that includes gallium). In such an example, more than about 90 percent of the gallium can be preferentially segregated to the grain boundary (e.g., located within the grain boundary material). While higher percentages of gallium may optionally be included in a melt, in general, a higher the percentage of gallium can result in formation of globular nodules within a particle. Such globular nodules can result in a reduction of mechanical strength of a particle. Where a powder is to be used to form a part or a tool (e.g., a downhole tool) that is to withstand certain mechanical force(s), yet be degradable, the powder may be formed of a melt that is tailored to meet mechanical force and degradability criteria. As an example, a degradability criterion may be met by including at least about two percent by weight of a select material (e.g., or materials) in a melt. In such an example, a powder formed by the melt can be at least about two percent by weight of the select material (e.g., considering material conservation). As an example, a powder may be of at least about two percent by weight of a select material (e.g., or select materials).

As an example, a melt may include greater than about 80 percent by weight of an aluminum alloy and greater than about two percent by weight of a select material or materials. In such an example, consider as the select material, or materials, one or more of gallium, indium, tin, bismuth, and lead. As an example, a select material or materials may include one or more basic metals where, for example, basic metals include gallium, indium, tin, thallium, lead and bismuth (e.g., basic metals of atomic number of 31 or greater). As an example, grain boundary material may include aluminum, which is a basic metal with an atomic number of 13, in addition to one or more other basic metals. As an example, a basic metal may be a post-transition metal (e.g., metallic elements in the periodic table located between the transition metals (to their left) and the metalloids (to their right) and including gallium, indium and thallium; tin and lead; and bismuth). As an example, a melt may optionally include mercury, which is a transition metal (e.g., a group 12 transition metal). As an example, a powder formed of such a melt can include mercury, which may be a boundary material that bounds grains of particles of the powder. As an example, a melt may optionally include zinc, which is a transition metal (e.g., a group 12 transition metal).

As an example, a melt and a powder formed from the melt can include one or more alkali metals. For example, consider one or more of lithium, sodium, and potassium. As an example, a melt and a powder formed from the melt can include one or more alkaline earth metals. For example, consider one or more of beryllium, magnesium, calcium, strontium and barium. As an example, a powder and/or a melt may include one or more rare earth elements. As an example, a powder and/or a melt may include scandium, thallium, etc.

As an example, one or more of an alkali metal, an alkaline earth metal, or a basic metal may be used as the select material or materials for a melt. As an example, a melt may include gallium and indium. The gallium and indium may preferentially segregate to the grain boundary, for example, during a severe plastic deformation process, resulting in a desired powder particle. Materials of an aluminum alloy, such as, for example, aluminum, magnesium, silicon, copper, for example, may also appear in the grain boundary.

As an example, consider cooling a melt that includes aluminum, magnesium and gallium such that grains form with a first amount of gallium and such that at the boundaries of the grains material forms with a second amount of gallium that exceeds the first amount of gallium. In such an example, the material at the boundaries may be characterized as gallium enriched. In such an example, the amount of gallium in the grains may be negligible (e.g., grains may be formed of an aluminum alloy substantially devoid of gallium).

As an example, a material may include aluminum (e.g., melting point of about 1220 degrees F., about 660 degrees C. or about 930 K), magnesium (e.g., melting point of about 1200 degrees F., about 650 degrees C. or about 920 K) and gallium (e.g., melting point of about 86 degrees F., about 30 degrees C. or about 300 K). Such a material may be provided in a molten state and cooled to form grains and boundaries where the boundaries are enriched in gallium (e.g., a low melting point material of the bulk material).

As an example, a material may include gallium, indium and tin. In such an example, gallium, indium (e.g., melting point of about 314 degrees F., about 157 degrees C. or about 430 K) and tin (e.g., melting point of about 450 degrees F., about 232 degrees C. or about 500 K) may alloy (e.g., forming a eutectic alloy with a melting point of about −19 degrees C., about −2 degrees F. or about 250 K). Such a material may be provided in a molten state and cooled to form grains and boundaries where the boundaries are enriched in at least gallium (e.g., as an alloy of gallium, indium and tin as a low melting point material of the bulk material).

As an example, a material may include aluminum, magnesium and copper (e.g., melting point of about 1990 degrees F., about 1090 degrees C. or about 1360 K). In such an example, the material may experience an increase in strength when subjected to solution heat treatment and quenching. As an example, an aluminum, magnesium and copper alloy may increase in strength and exhibit considerable ductility upon ageing at ambient temperature (e.g., about 25 degrees C. or about 300 K).

As an example, an alloy may be characterized by a series designation. For example, consider the following series that include aluminum: 1000 series alloys that include a minimum of 99 weight percent aluminum content by weight, 2000 series alloys that include copper, 3000 series alloys that include manganese, 4000 series alloys that include silicon, 5000 series alloys that include magnesium, 6000 series alloys that include magnesium and silicon, 7000 series alloys that include zinc, and 8000 series alloys that include one or more other elements not covered by other series (e.g., consider aluminum-lithium alloys).

As an example, alloys that include aluminum may be represented by designations such as: 1xx.x series that include a minimum of 99 percent aluminum, 2xx.x series that include copper, 3xx.x series that include silicon, copper and/or magnesium, 4xx.x series that include silicon, 5xx.x series that include magnesium, 7xx.x series that include zinc, 8xx.x series that include tin and 9xx.x that include other elements.

As to 1000 series alloys, with aluminum of 99 percent or higher purity, such alloys may be characterized by considerable resistance to corrosion, high thermal and electrical conductivity, low mechanical properties and workability, while tending to be non-heat treatable.

As to 2000 series alloys, these include copper as an alloying element, which tends to impart strength, hardness and machinability; noting that such alloys tend to be heat treatable.

As to 3000 series alloys, these include manganese as an alloying element and they tend to have a combination of corrosion resistance and formability while tending to be non-heat treatable.

As to 5000 series alloys, these include magnesium as an alloying element, which may be, for example, optionally included along with manganese to impart a moderate- to high-strength, non-heat-treatable alloy. A 5000 series alloy may be weldable and relatively resistance to corrosion (e.g., even in marine applications).

As to 6000 series alloys, these include magnesium and silicon in various proportions to form magnesium silicide, which makes them heat treatable. Magnesium-silicon (or magnesium-silicide) alloys tend to possess good formability and corrosion resistance with high strength.

As to 7000 series alloys, these include zinc as an alloying element and, for example, when coupled with a smaller percentage of magnesium, such alloys may tend to be heat-treatable and of relatively high strength.

As an example, a material may be degradable and, for example, an alloy may be degradable (e.g., a degradable alloy). As an example, a material may degrade when subject to one or more conditions (e.g., over time). For example, consider one or more environmental conditions and/or "artificial" conditions that may be created via intervention, whether physical, chemical, electrical, etc. As an example, conditions can include temperature, pressures (e.g., including loads and forces), etc.

As an example, a degradable alloy may degrade at least in part due to presence of internal galvanic cells (e.g., that provide for galvanic coupling), for example, between structural heterogeneities (e.g. phases, internal defects, inclusions, etc.). As an example, a degradable material may resist passivation or, for example, formation of one or more stable protective layers.

As an example, a degradable alloy can include one or more alloying elements "trapped" in "solid solution". As an example, a material may include a metal such as aluminum, which may be impeded from passivating or building a resilient protective layer (e.g., aluminum oxide such as $Al_2O_3$).

As an example, a material can include one or more ceramics. For example, a material can include an inorganic, nonmetallic solid that includes metal, nonmetal or metalloid atoms, at least in part held in ionic and covalent bonds. A ceramic may be regular and/or irregular in structure, for example, atoms may be regularly oriented and crystalline, semi-crystalline and/or amorphous (e.g., ceramic glass). As an example, a ceramic may be an oxide (e.g., alumina, beryllia, ceria, zirconia, etc.). As an example, a ceramic may be a nonoxide (e.g., carbide, boride, nitride, silicide, etc.). As an example, a ceramic may include an oxide and a nonoxide.

As an example, a material can include one or more oxides. As an example, during processing of an alloy in the presence of oxygen, one or more oxides may form. For example, consider an alloy that includes aluminum where alumina (e.g., an aluminum oxide, $Al_2O_3$) forms. As another example, consider an alloy that includes silicon where silica (e.g., a silicon oxide, $SiO_2$) forms. As an example, an oxide may be a dispersed material in a particle. As an example, an oxide may be of a size of about 10 nm or less and optionally about 5 nm or less.

As an example, a material can include concentrations of one or more solute elements, for example, trapped in interstitial and in substitutional solid solutions. As an example, concentrations, which may be spatially heterogeneous, of such one or more solute elements, may be controlled through chemical composition, processing, etc. As an example, consider rapid cooling where solubility is higher than at ambient temperature or temperature of use.

As an example, a material may include one or more elements or phases that liquate (e.g., melt, etc.) once elevated beyond a certain temperature, pressure, etc., which for alloys may be predictable from phase diagrams, from thermodynamic calculations (e.g., as in the CALPHAD method), etc.

As an example, a material may "intentionally" fail via liquid-metal embrittlement, for example, as in an alloy that includes gallium and/or indium. As an example, a degradable material may include an alloy or alloys and possess phases that may be susceptible to creep (e.g., superplastic) deformation (e.g., under intended force, etc.), possess phases that are brittle (e.g., which may rupture in response to impact, etc.).

As an example, a degradable material may include a calcium alloy such as, for example, calcium-lithium (Ca—Li), calcium-magnesium (Ca—Mg), calcium-aluminum (Ca—Al), calcium-zinc (Ca—Zn), calcium-lithium-zinc (Ca—Li—Zn), etc. As an example, in a calcium-based alloy, lithium may be included in concentrations, for example, between about 0 to about 10 weight percent (e.g., to enhance reactivity, etc.). As an example, concentrations ranging from about 0 to about 10 weight percent of one or more of aluminum, zinc, magnesium and silver may enhance mechanical strength.

As an example, a material may include one or more magnesium-lithium (Mg—Li) alloys, for example, enriched with tin, bismuth and/or one or more other low-solubility alloying elements.

As an example, a material can include one or more alloys of aluminum. As an example, a material may include one or more of an aluminum-gallium (Al—Ga) alloy and an aluminum-indium (Al—In) alloy. As an example, a material may include one or more of an aluminum-gallium-indium (Al—Ga—In) and an aluminum-gallium-bismuth-tin (Al—Ga—Bi—Sn) alloy.

As an example, a material can include aluminum, gallium and indium. For example, consider a material with an alloy of about 80 weight percent aluminum, about 10 weight percent gallium and about 10 weight percent indium. Such a material may include Vickers microhardness (500 g) of about 32 (#1), 34 (#2), 34 (#3), 30 (#4), 35 (#5), 36 (#6) and 33 (average) and estimated strength of about 100 (MPa), 15 (ksi) and 1.5 (normalized).

As an example, a component may be formed of material that provides a desired degradation rate and desired mechanical properties (e.g., strength, elasticity, etc.). As an example, a degradation rate may depend upon one or more conditions (e.g., temperature, pressure, fluid environments), which may be exist in an environment and/or may be achieved in an environment (e.g., via one or more types of intervention). As an example, a material may be conditionally degradable (e.g., degradable upon exposure to one or more conditions).

As an example, a material may be a metal matrix composite (MMC), which is a composite material with at least two constituent parts, one being a metal, the other material may be a different metal or another material, such as a ceramic or organic compound. When at least three materials are present, it may be referred to as a hybrid composite. As an example, a MMC may be complementary to a cermet.

As an example, a method may utilize one or more powder metallurgy (PM) techniques. As an example, one or more powder metallurgy techniques may be utilized to form particulate material. As an example, one or more powder metallurgy techniques may be utilized to form a blend of particulate materials. As an example, one or more powder metallurgy techniques may be utilized to form a component or components, for example, from a blend of particulate materials.

As an example, a material may be tailored as to one or more of its mechanical properties and/or its dissolution characteristics (e.g., degradation characteristics) via one or more processes, which can include one or more SPD processes. In such an example, the material may be refined as to its grain size and/or the defect structure of its grain boundaries. As mentioned, the Hall-Petch relation can exhibit a minimum size, which may be surpassed depending on desired properties and/or characteristics of a material. For example, such a material may still be strengthened when compared to a non-SPD processed material yet include a structure size that is less than the minimum Hall-Petch relation size, which may, for example, benefit dissolution (e.g., in a desired manner).

As an example, near-nanostructured or ultrafine-grained (UFG) materials may be defined as materials having grain sizes whose linear dimensions are in the range of, for example, about 100 nm to about 500 nm. Such materials may optionally be or include alloys and, for example, be formed at least in part via one or more severe plastic deformation (SPD) processes. For example, an atomized powder may be subjected to one or more SPD processes.

In contrast to coarse-grained counterparts, near-nanostructured or UFG materials may benefit from reduced size or dimensionality of near nanometer-sized crystallites as well as, for example, from numerous interfaces between adjacent crystallites.

As an example, a process can include rapid cooling to achieve a desired rate of cooling of material. As an example, a powder metallurgy (PM) process can refine features and improve properties of material. For example, grain size can be reduced because of the short time available for nuclei to grow during solidification. As an example, rapid cooling can increase one or more alloying limits in aluminum, for example, by enhancing supersaturation, which can enable greater precipitation-hardening with a reduction in undesirable segregation effects that may occur when IM alloys are over-alloyed. Moreover, elements that are low in solubility (e.g., practically insoluble) in a solid state may be soluble in a liquid state and may be relatively uniformly dispersed in powder particles during a process that employs rapid solidification. Non-equilibrium metastable phases or atom 'clusters' that do not exist in more slowly cooled ingots may be created by employing a rapid solidification rate; such phases can increase strength.

As an example, a process can include introduction of one or more features via powder surfaces, for example, as scale of particles becomes finer, surface-to-volume ratio of the particles increases.

As an example, one or more oxides can be introduced on a desired scale from powder surfaces by mechanical attrition, for example, to result in oxide dispersion strengthening (ODS).

As an example, a process may include introducing one or more carbides ($B_4C$, SiC, etc.). As an example, a process may include introducing one or more insoluble dispersoids (e.g., one or more materials that are practically insoluble in one or more defined environments).

As an example, a process can include cold-working powder particles by ball-milling. For example, a process can include cold-working powder particles in a cryogenic medium (e.g., or cryogenic media). Such a process can result in increased dislocation strengthening and, upon consolidation, a finer grain (and sub-grain) size which can be further stabilized by one or more ceramic dispersoids (e.g., as may be introduced during such a SPD process).

As an example, a method can include naturally ageing one or more components in a wellbore at one or more wellbore temperatures for one or more periods of time to thereby alter properties of the one or more components, which may be at least in part degradable.

As an example, a component may have an operational lifetime in a wellbore that is less than about 8 hours and then age in a manner at least in part thermally that causes the component to fail more readily. In such an example, where the component is degradable in the wellbore environment, ageing may assist with degradation, for example, via one or more failure mechanisms (e.g., elongation to failure, etc.).

As an example, a material may undergo Ostwald ripening where a portion of smaller entities dissolve and redeposit on larger entities. For example, consider small crystalline grains dissolving and constituents thereof redepositing onto larger crystalline grains such that the larger crystalline grains increase in size. Near a larger crystalline grain, a zone may exist, which may be due to a gradient or gradients in composition. As an example, intermetallic precipitates may form about a larger crystalline grain, which may be considered a macroscopic process (e.g., on a scale of about 50 microns).

As an example, a material may be treated to undergo Ostwald ripening and halo-ing to achieve desired properties, which can include dissolution rate, strength and/or ductility. For example, a haloed entity in the material may dissolve at a rate that differs from smaller entities in the material. As an example, a treatment may aim to achieve a population density of haloed entities to smaller entities, for example, to tailor one or more of dissolution rate, strength and ductility.

As an example, a water reactive or degradable powder can be blended with thermally stable nanocrystalline grains processed by cryomilling and further stabilized by inclusion of one or more types of dispersoids (e.g., SiC, $B_4C$, $Al_2O_3$, etc.).

As an example, a method can include using a blend of un-milled coarse powder(s) with a cryomilled-blend of water reactive or degradable powder (e.g., in a range of about 5 percent to about 95 percent) and one or more ceramic dispersoids (e.g., SiC, $B_4C$, $Al_2O_3$, etc.). In such an example, the average size of the water reactive powders or otherwise degradable powder is larger than the average size of the one or more ceramic dispersoids.

As an example, a method can include blending water reactive or degradable powder (e.g., in a range of about 5 percent to about 95 percent) with a material that includes thermally stable nanocrystalline grains processed by cryomilling. As an example, such a blend may be further mixed with one or more monomers, polymers, etc. to form a degradable polymeric material. In such an example, composition of the blend of powder or powders may provide for tailoring a degradable polymeric material (e.g., for a particular application, etc.).

As an example, a method can include using a blend of water reactive or degradable powder from an inert gas atomization (IGA) tank, a first cyclone and a second cyclone, for example, to help maximize yield from melt that is atomized and to help produce a multi-powder size distribution. In such an example, the blend (e.g., in a range of about 5 percent to about 95 percent) may be further blended, for example, with thermally stable nanocrystalline grains processed by cryomilling and further blended with one or more dispersoids (e.g., SiC, $B_4C$, $Al_2O_3$, etc.).

Figure 7:
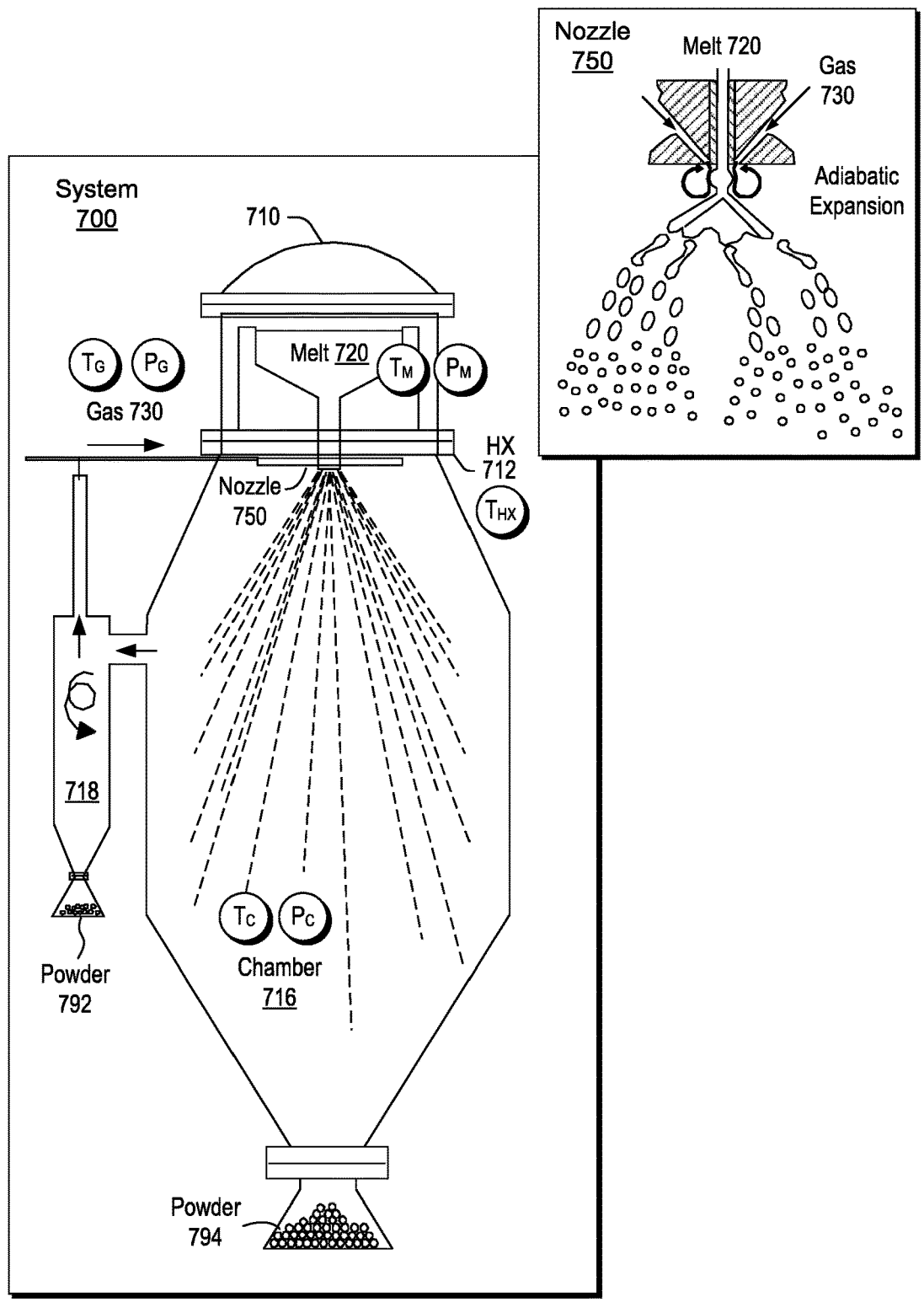
FIG. 7 illustrates an example of a system.

FIG. 7 shows an example of a system 700 that can process a melt 720 using gas 730 to form particles. In such an example, the particles may be composed of melt constituents and/or composed of melt constituents and optionally one or more gas constituents (e.g., consider oxygen in the gas 720 forming an oxide such as alumina upon exposure to aluminum in the melt 720). Particles formed via the system 700 may be powder particles. The system 700 may be considered to be a powder metallurgical system that can be implemented using powder metallurgy technology.

As shown in FIG. 7, the system 700 includes a vacuum induction furnace 710, an optional heat exchanger 712 (HX), a chamber 716, a cyclone chamber 718, and a nozzle 750. As illustrated, a rapid expansion of the gas 730 as provided to the nozzle 750 can break up the melt 720, which may form a thin sheet and subsequently ligaments, ellipsoids and/or spheres (e.g., particles). In an example of an inert gas atomization process, particles formed may be substantially spheroidal. As an example, an atomization process may be a gas atomization process (e.g., including inert and/or non-inert gas), a water atomization process, a mechanical pulverization process, etc.

Particles may be collected in the chamber 716 and in the cyclone chamber 718, which can allow gas to exit and optionally recycle (e.g., with make-up gas, etc. to maintain a gas composition where multiple gases may be used). In such an example, the cyclone chamber 718 may collect particles that are finer than the particles collected in the chamber 716. Particles of either or both chambers 716 and 718 may be combined, separated, etc.

As an example, the system 700 may include multiple cyclones, which may be in parallel and/or in series. For example, the system 700 may include a cyclone in fluid communication with the cyclone 718. As an example, particles collected (e.g., powder particles) may be of different size distributions, etc., depending on where the particles are collected (e.g., chamber 716, cyclone 718, other cyclone, etc.).

As to operational parameters of an atomization process, consider, for example, alloy composition, melt feed rate, melt temperature, melt viscosity, heat exchanger temperature (e.g., heat transfer rate, etc.), gas pressure and temperature, type of gas, nozzle geometry, etc. Gas atomization may produce particles that are substantially spherical in their shapes and that include grains and grain boundaries. As an example, gas atomization may produce particles that include crystalline structure and/or amorphous structure.

As an example, a melt temperature (see, e.g., $T_M$) may be a superheated temperature. As an example, a melt temperature may be greater than about 650 degrees C. (e.g., greater than about 700 degree C. and optionally greater than about 800 degrees C.). As an example, a chamber such as the chamber 716 may be at a temperature of about 70 degrees C. (e.g., a temperature of the order of hundreds of degrees C. less than a melt temperature). As an example, gas may expand relatively adiabatically, which may facilitate cooling of melt and reducing thermal shock.

As an example, heat transfer may occur within a system such as the system 700 such that particles are crystalline, amorphous or crystalline and amorphous.

As an example, a method may include cooling melt at a rate that causes at least a portion of a particle formed from the melt to be amorphous. For example, a method may include cooling via a cryogenic cooled target (e.g., consider the heat exchanger 712 of the system 700). As an example, a cryogenic cooled target may be positioned in front of an atomizing nozzle, for example, to achieve a cooling rate (e.g., $R_c$) where vitrification occurs for atomized (melt) droplets (e.g., to be at least in part a metallic glass structure, which may be a bulk metallic glass structure). As an example, a material may be characterized at least in part by a glass transition temperature ($T_g$) where below that temperature an amorphous material may be glassy (e.g., whereas above $T_g$ it may be molten).

As an example, a method may include introduction of a gas at a low temperature. For example, consider introduction of helium in an atomization stream (e.g., introduction of helium as a gas, in a gas provided to a nozzle or nozzles).

As an example, a method may include increasing the superheating temperature of a melt, which may increase a driving force (e.g., a temperature differential) as to heat transfer (e.g., cooling). As an example, a method may include forming particles of a particular size or smaller such that heat transfer may occur more rapidly for the particles. For example, consider selecting a nozzle dimension (e.g., diameter, slit width, etc.) to achieve a particular particle size. As an example, a method may include analyzing dendrite arm spacing during cooling and adjusting one or more parameters of a gas atomization process such that amorphous particles may be formed.

As an example, a melt may be analyzed as to one or more properties such as, for example, a glass-transition or vitrification temperature (e.g., $T_g$). As an example, a system may be operated such that transformation takes place at the glass-transition temperature, $T_g$, below an equilibrium temperature for the solidification (e.g., a liquidus temperature, $T_L$), which may act to "freeze" an atomized melt in a non-equilibrium state (e.g., at least in part as an amorphous material). As an example, a liquidus temperature may be the maximum temperature at which crystals can co-exist with a melt in thermodynamic equilibrium. As an example, a method may consider a solidus temperature (Ts) that quantifies a point at which a material crystallizes. As an example, for a material, a gap may exist between its liquidus and solidus temperatures such that material can include solid and liquid phases simultaneously (e.g., akin to a slurry).

As an example, a method may include cooling a melt to produce an amorphous melt-span ribbon. In such an example, the ribbon may be further processed, for example, by mechanical crushing of the ribbon to form a powder.

As an example, a water reactive powder (e.g., a degradable powder) may be processed to form a component or components. In such an example, the powder may be produced by gas atomization (e.g., using one or more gases, optionally one or more inert gases), by ball milling, by crushing or other mechanical means, by sol-gel, etc.

As an example, a powder may include particles of one or more particle size distributions. For example, consider D90 less than about 44 microns (e.g., a mesh size of about 325), D90 less than about 60 microns, D90 less than about 90 microns, etc.

As an example, a material may be subjected to one or more SPD processes. As an example, a method can include employing one or more SPD processes.

As an example, where a method includes processing via ECAP, the method can include shearing of grains in consolidated or unconsolidated powder through a channeled die at low to high angles. As an example, ECAP can include passing material through a die (e.g., or dies) at various angles, which may abet refining of grains (e.g., of a water reactive powder), for example, to achieve a desired minimum grain size (e.g., after a certain number of ECAP passes). As an example, a method can include ECA pressing, for example, at one or more temperatures.

As an example, a method can include performing ECAP to abet refining of grains, for example, to achieve a minimum grain size (e.g., after a certain number of ECAP passes).

As an example, a method can include performing cryomilling to abet refining of grains, for example, to achieve a minimum grain size (e.g., after a certain duration of milling).

As an example, a method can include performing HPT to abet refining of grains, for example, to achieve a minimum grain size (e.g., after a certain number of HPT turns or revolutions).

As an example, a method can include performing cold working to abet refining of grains, for example, to achieve a minimum grain size (e.g., after a certain percentage of cold working).

As an example, a method may include controlling grain size. For example, consider alternating grain size from the point of inflection of an inverse Hall-Petch trend (e.g., varying for different alloys, consider about 50 nm) to an upper limit of ultrafine grains (e.g., about 1000 nm or 1 micron). As an example, a method can include controlling grain size by controlling one or more parameters of one or more SPD processes (e.g., cryomilling time, ECAP passes, HPT turns or revolutions, percentage of cold work, etc.).

As an example, a method can include processing water reactive powder via one or more SPD processes, for example, to tailor dissolution rate in a fluid, to tailor dissolution rates in various fluids, etc. As an example, a fluid may be a hydraulic fracturing fluid. As an example, a fluid may include a salt concentration or concentrations of salts. For example, consider a fluid that includes one or more of NaCl, KCl and $MgCl_2$. As an example, a fluid may be an aqueous fluid. Such an aqueous fluid may include one or more salts. As an example, a method may include varying percentages of one or more inhibited acid that may be used in one or more spearheading operations during hydraulic fracturing. As an example, a method can include tailoring dissolution rate (e.g., degradation rate) by controlling grain size. As an example, one or more SPD processes may be used for refining grains, for example, to achieve a minimum grain size (e.g., optionally altering grain size from the point of inflection of an inverse Hall-Petch trend).

As an example, dissolution rate (e.g., degradation rate) may be influenced by disruption of a continuous grain boundary network. One or more characteristics of such a network may be influenced by one or more SPD processes. As an example, dissolution rate (e.g., degradation rate) may be influenced by precipitation of an additional phase of dispersoids, for example, as may be processed during one or more other SPD processes.

As an example, a method can include precipitating second phase dispersoids. In such an example, the properties of such dispersoids may be influenced by choice of one or more cryogenic media. For example, consider use of one or more of liquid nitrogen and liquid argon. As an example, precipitation of second phase dispersoids may be influenced by choice of one or more grinding media. For example, consider use of one or more of low alloy/carbon steel balls, stainless steel balls, Ni alloy balls, ceramic balls, etc.

As an example, a gas atomization process can generate particles that may be characterized at least in part by size (e.g., consider a size distribution of about 10 microns to about 20 microns). In such an example, grains in particles may be of the order of about a micron. As an example, particles may be formed via gas atomization that include grains of the order of less than about one micron (e.g., optionally less than about half a micron).

As an example, a method may include one or more of the following processes and/or produce a material that includes one or more properties listed below (e.g., of a desired high strength degradable alloy): inert gas atomization (IGA) of a brittle cast melt with controlled flow through one or more nozzles (e.g., optionally of varying sizes) to yield powder particles of varying mesh size; particulate (approximately 80 percent to approximately 100 percent (e.g., approximately 90 percent) screened distribution) with sizes varying between about 10 microns and about 70 microns (e.g., between about 20 microns and about 60 microns).

Figure 8:
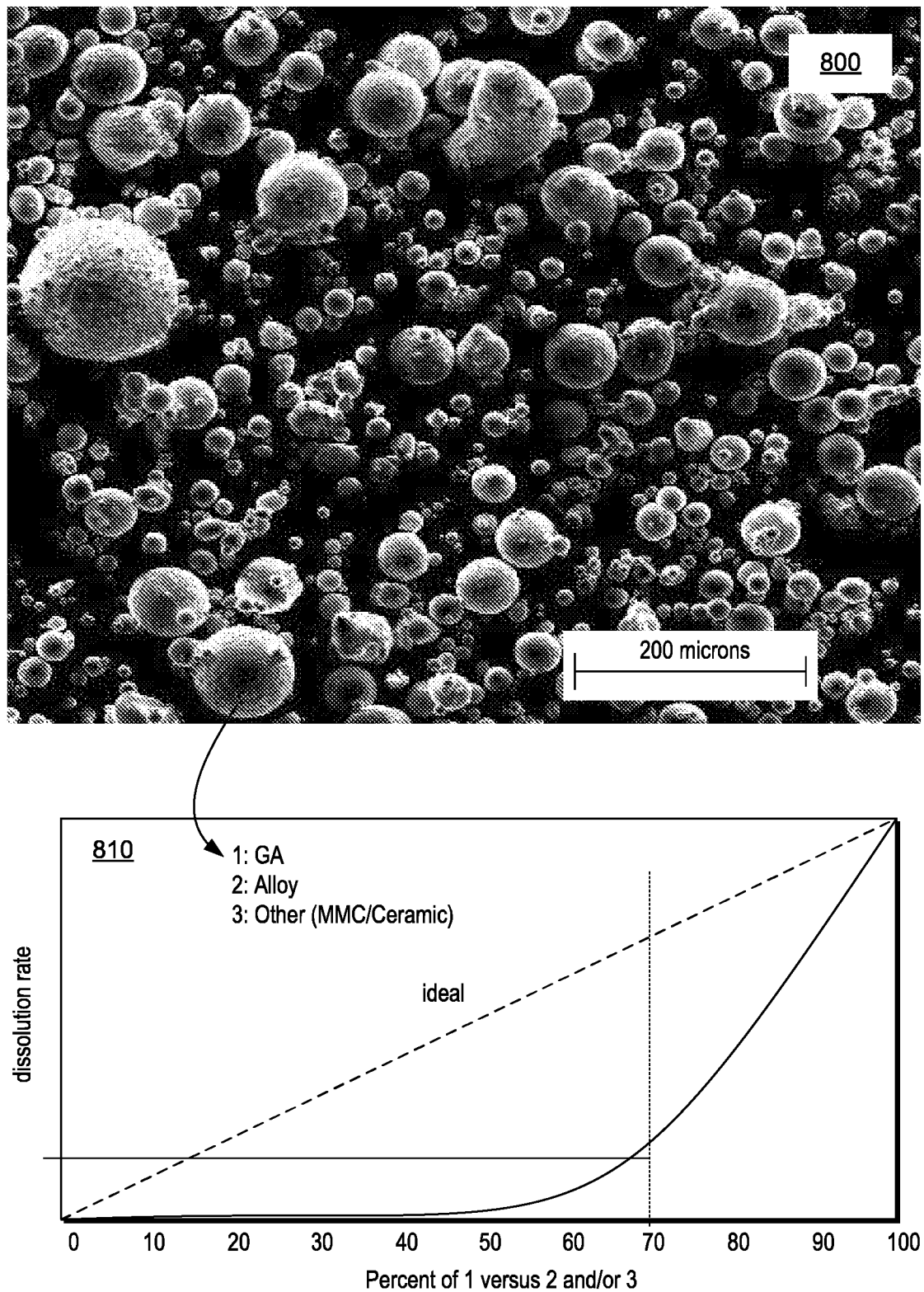
FIG. 8 illustrates an example of a micrograph of an example of particles.

FIG. 8 shows a scanning electron micrograph 800 of particles produced via gas atomization of a brittle cast melt. Such particles may be formed by cooling the melt as it exits a nozzle (see, e.g., the nozzle 750 of the system 700 of FIG. 7). Such cooling may be adiabatic cooling. For example, adiabatic cooling can occur when pressure on an adiabatically isolated system is decreased, allowing it to expand, thus causing it to do work on its surroundings. When the pressure applied on a parcel of gas is reduced, the gas in the parcel is allowed to expand; as the volume increases, the temperature falls as internal energy decreases.

As an example, a gas atomization process may "capture" melt in a particle as a supersaturated solid solution. As an example, a particle may include properties that can reduce segregation of alloying constituents in solid solution. As an example, a gas atomization process may yield fine to ultrafine grain microstructure in particles that form a powder.

FIG. 8 also shows an example plot 810 that illustrates an approximate relationship between dissolution rate and percent of a first material versus one or more other materials (e.g., a second material, a third material, etc.).

In the plot 810, where the first material is a powder of degradable material formed at least in part via gas atomization (e.g., GA), the dissolution rate of a polymeric material formed of the constituent materials and one or more polymers (e.g., an optionally one or more additives) may be less than an "ideal". For example, the polymeric material may exhibit a relatively low dissolution rate (e.g., less than about 20 percent of a dissolution rate of the first material itself), until the first material approaches a certain percentage or range of percentages of the total. As an example, the change in dissolution rate may be more sensitive to the percentage of the first material in a particular range (e.g., a relatively high slope in dissolution rate versus percentage of the first material).

Figure 9:
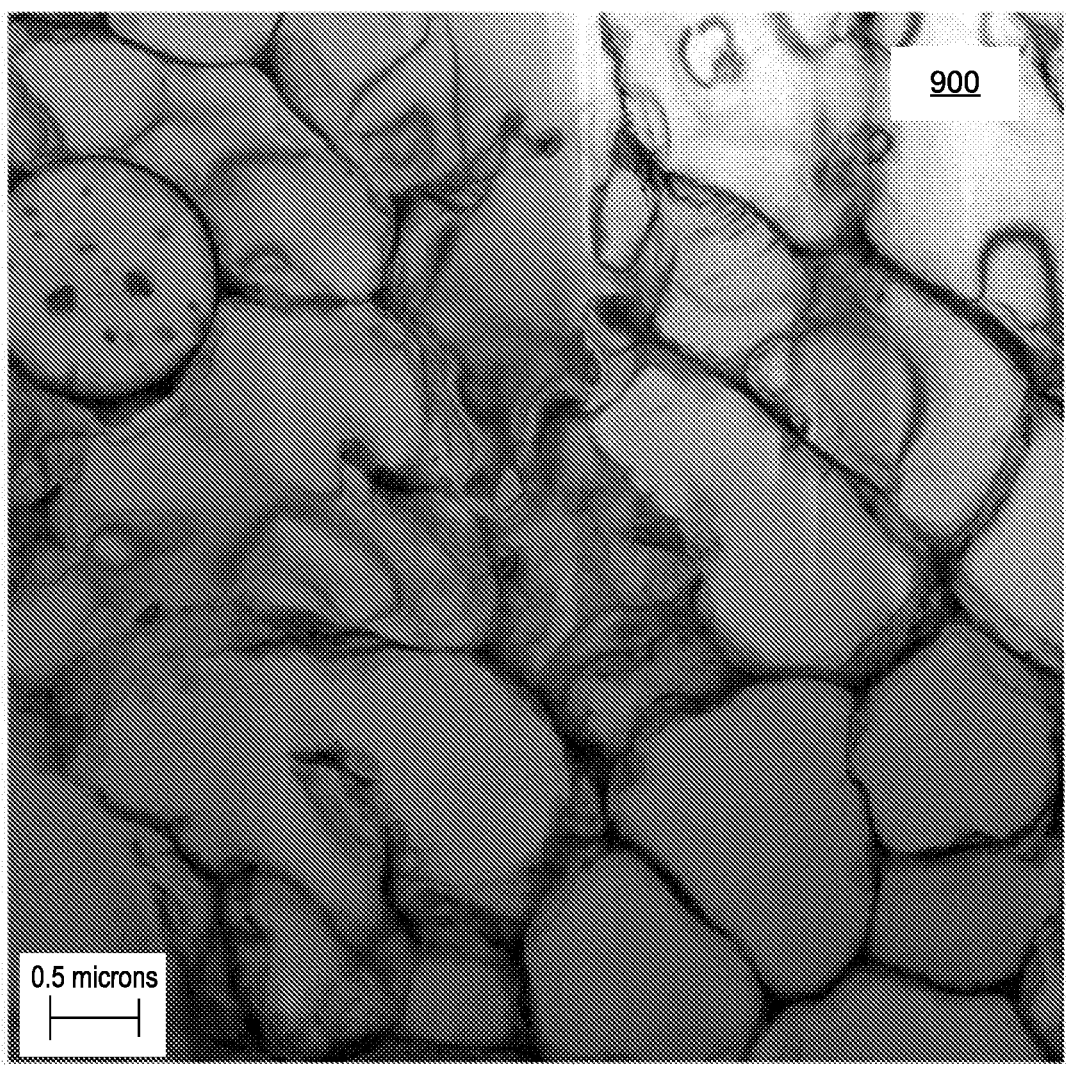
FIG. 9 illustrates an example of a micrograph of an example of a particle.

FIG. 9 shows an example of a transmission electron micrograph (TEM) 900 of a particle of a powder. The TEM 900 shows ultrafine grains with darker grain boundaries; noting focus ion beam (FIB) sample preparation. Specifically, the TEM 900 shows that the particle includes grains with dimensions of the order of about one micron or less. The TEM 900 shows various grains that include dimensions of about 0.5 microns.

As an example, a process can generate particles with grains where, for example, the processing provides for segregation of one or more low melting point constituents at grain boundaries. In such an example, the one or more low melting point constituents can coat grains and through such coating form a galvanic couple.

As an example, particles of a powder may include grain boundary interfaces where intermetallic precipitates can form during one or more ageing process, which may, for example, result in additional strengthening of the material (e.g., alloy, alloy and ceramic, etc.).

As an example, a process may provide for weakening of grain boundary interfaces in a component formed of a powder produced via gas atomization, which may help to promote embrittlement of the boundaries and further enhance a degradation mechanism (e.g., or degradation mechanisms). For example, consider a particle of a material that includes aluminum and gallium where gallium enrichment at grain boundary interfaces may promote embrittlement of the boundaries and where at least gallium interacts with fluid in a manner that causes degradation of the particle. As an example, a component formed of such particles (e.g., via processing of such particles) may degrade upon exposure to fluid and via embrittlement.

As an example, a material may include one or more oxide dispersoids, which may provide enhanced thermal stability and strengthening, for example, due to pinning of grain boundaries and dislocations.

As an example, differential cooling of a warm powder may abet diffusion of one or more low melting point constituents from a trapped supersaturated solid solution to a grain interior along a grain boundary, for example, causing liquid-metal embrittlement, which may enhance a degradation mechanism (e.g., consider a mechanism where gallium interacts with fluid in a manner that causes degradation).

Figure 10:
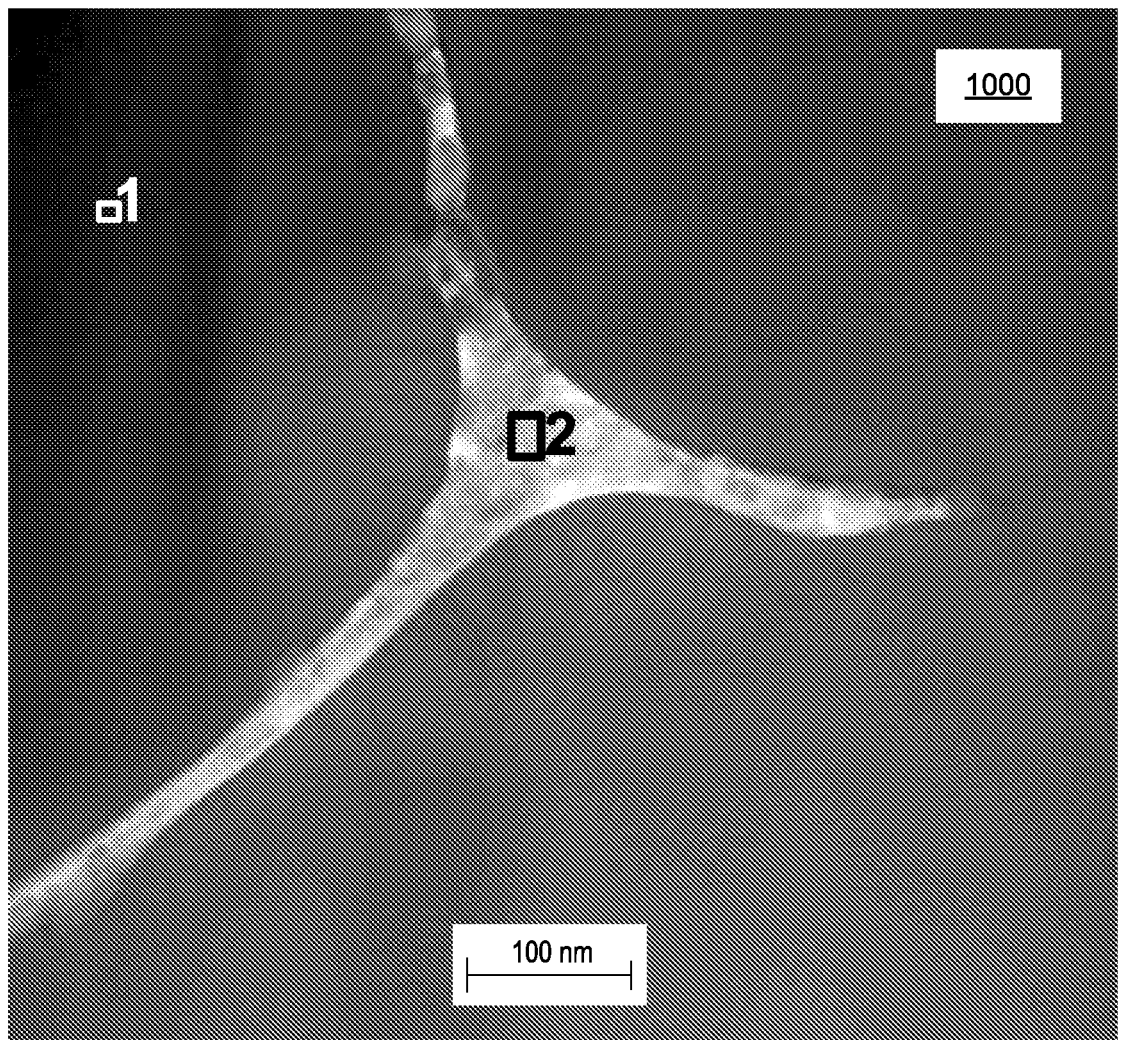
FIG. 10 illustrates an example of a micrograph of an example of a particle.

FIG. 10 shows an example of a TEM 1000 that includes a triple junction between three grains (e.g., a GBTP) in a particle of a powder. The TEM 1000 shows contrast and compositional differences between the grain boundary and the grain; noting Focus Ion Beam (FIB) sample preparation. The TEM 1000 includes two windows that correspond to samples: Sample 1 for grain material composition and Sample 2 for grain boundary material composition.

As an example, a method can include energy-dispersive X-ray (EDX) analysis of composition of a sample (e.g., Sample 1 of the TEM 1000 and Sample 2 of the TEM 1000). EDX is an analytical technique that can be applied for elemental analysis or chemical characterization of a sample. EDX involves interaction of a source of X-ray excitation (e.g., electrons) and a sample where, for example, a number and energy of X-rays emitted from the sample can be measured by an energy-dispersive spectrometer (e.g., EDS). As energy of X-rays can be characteristic of the difference in energy between two shells, and of the atomic structure of an element from which they were emitted, this allows the elemental composition of the sample to be measured.

As an example, in a particle, material at a grain boundary may be enriched in gallium when compared to material in a grain. As an example, in a particle, material at a grain boundary may be enriched in indium when compared to material in a grain. As an example, in a particle, material at a grain boundary may be enriched in gallium and indium when compared to material in a grain.

As an example, a particle may include material at a grain boundary that, upon analysis, generates gallium counts at one or more energies of less than about 2 keV and generates counts gallium counts at one or more energies greater than about 8 keV. In such an example, a ratio of counts may be about two to one. As an example, such a particle may include material at a grain boundary that, upon analysis, generates indium counts at energies from about 2 keV to about 5 keV. In such an example, such counts may be less than counts of a maximum gallium count at an energy greater than about 8 keV and less than counts of a maximum gallium count at an energy less than about 2 keV.

As an example, a powder may respond to dissolution and may be reactive (e.g., upon exposure to fluid, etc.). As an example, a powder may be added to one or more polymers, for example, to produce a relatively homogeneous polymeric material that has a desired rate of degradation (e.g., when subjected to one or more conditions). As an example, degradation of powder, and hence a polymeric material made at least in part therefrom, can be controlled by blending of one or more other powders (e.g., of one or more mesh sizes, etc.).

As an example, one or more ceramic and/or other particulates may be added to a powder (e.g., or powders) to form a metal matrix composites (MMC).

An alloy can include crystalline, amorphous or mixed structure (e.g. partially crystalline, partially amorphous). Features characterizing the structure can include grains, grain boundaries, phases, inclusions, etc. As an example, one or more features may be of the order of macroscopic, micron or submicron scale, for instance nanoscale. Shape, size, shape and size, etc. may be characteristics that can influence mechanical properties and, for example, reactivity.

As an example, a reactive material may include an element that tends to form positive ions when its compounds are dissolved in a liquid solution and whose oxides form hydroxides rather than acids with water. As an example, a material may disintegrate. For example, consider an alloy that loses structural integrity and becomes dysfunctional for instance due to grain-boundary embrittlement or dissolution of one of its elements. As an example, a byproduct of degradation from grain boundaries may not necessarily include an ionic compound such as a hydroxide and may include a metallic powder residue (e.g., consider severely embrittled aluminum alloys of gallium and indium).

As an example, a material may be electrically conductive and may include a metallic luster.

As an example, a material may be degradable and, for example, an alloy may be degradable (e.g., a degradable alloy). As an example, a material may degrade when subject to one or more conditions (e.g., over time). For example, consider one or more environmental conditions and/or "artificial" conditions that may be created via intervention, whether physical, chemical, electrical, etc. As an example, conditions can include temperature, pressures (e.g., including loads and forces), etc.

As an example, a component may be made from a blend of particulate materials that include at least one age-hardenable particulate material. In such an example, the blend can include one or more degradable particulate materials and one or more non-degradable particulate materials. As an example, a component may be age-hardened prior to deployment, during deployment and/or after deployment.

As an example, a blend of particulate materials can include an aluminum alloy that may be an age-hardenable aluminum alloy. In such an example, the blend can include particulate material that is degradable, for example, when exposed to an aqueous environment. As an example, a component may be formed of a blend of materials where the component is age-hardenable and degradable in an aqueous environment (e.g., a downhole environment that includes water).

As an example, a material can include cryomilled nanocrystalline grains, which may be thermally stable. For example, a cryomilled nano and/or UFG solid may be thermally stable up to about 0.8 of an alloy's melting point.

As an example, a method can include thermal treatment of a water reactive or degradable alloy, which may be mixed with one or more polymeric materials to form a component. Such a method may include making a blend of cryomilled and un-milled particulate material. In such an example, the method can include solution annealing, which may act to put coarse un-milled grains into solution and promote precipitate hardening during an ageing cycle in an annealed fraction. In such an example, cryomilled nano grains may be retained from going into solution due to their enhanced thermal stability, however, growth may occur to a multimodal nano and/or UFG size abetting ductility to the blended solid.

As an example, a thermal treatment (e.g., one or more of solution annealing, ageing, etc.) may be applied during and/or after formation of a consolidated polymeric material from a blend of un-milled gas atomized powder with cryomilled gas atomized (GA) powder. As an example, an un-milled GA powder can be a water reactive powder. As an example, an un-milled GA powder can be formed of a melt of a heat treatable aluminum alloy series (e.g., consider 6XXX and/or 7XXX series). As an example, a cryomilled GA powder can be water reactive powder (e.g., degradable in an aqueous environment). As an example, a cryomilled GA powder can be formed of a melt of a heat treatable aluminum alloy series (e.g., consider 6000, 7000 series). As an example, a blend can be stabilized by ceramic particulates (e.g., SiC, $B_4C$, $Al_2O_3$, etc.) to produce a metal matrix composite (MMC). In such an example, addition of ceramic particulates may be before cryomilling or, for example, during blending of un-milled and cryomilled GA powders.

As an example, a method can include blending GA powders that can have different, close or similar peak age properties and thermal cycles.

As an example, a method can include solution annealing of a bulk solid consolidated from blended cryomilled and un-milled powders. In such an example, solution annealing may aim to put un-milled component(s) (e.g., coarse grained) into solution (e.g., for a set time duration) while retaining structure of highly thermally stable cryomilled (e.g., nano grain) counterparts; noting that some grain growth may occur in nano-cryomilled grains, for example, transforming them to nano and/or ultrafine duplex grains, which may abet additional ductility post thermal treatment.

As an example, a metal powder may be manufactured via one or more techniques, for example, depending on type of metal and alloy and desired properties. For example, a powder may be manufactured by reduction of oxides and other chemical techniques; atomization of metallic melts; pulverization of solids; electrolysis of water solutions or molten salts; etc.

As an example, dense particles of different chemical composition may be obtained by atomizing molten metal or alloys. For example, a metal stream can be atomized by process that may include one or more of atomizing in water, air, or an inert gas (e.g., argon or nitrogen).

As an example, a powder may be screened and, for example, subject to heat under a reducing atmosphere (e.g., consider surfaces of particles that are oxidized).

As an example, an atomization process may be employed to obtain one or more alloy powders, which may include an even distribution of alloying metals in the volume of each particle.

As an example, a PM alloy may circumvent segregation associated with ingot metallurgy (IM) product (casting etc.), where cooling from a molten state tends to be relatively slow, which may be detrimental to workability, etc.

In a PM process, an increased cooling rate may be employed compared to an IM process where, for example, the increased cooling rate may result in an extension of solid solubility limits that can lead to larger volume fractions of finer second-phase particles and/or formation of metastable phases.

As an example, a PM process may produce relatively homogeneous powder particles with substantial uniformity and with fine microstructure. Such characteristics may result enhanced mechanical properties.

As an example, an extension of phase fields and creation of additional phases can relate to supercooling, as achieved via one or more powder metallurgy techniques. As an example, microstructural refinement can occur in part due to reduced diffusion distances.

As an example, rapid cooling via a PM process can result in an increased tolerance to trapped elements (e.g., compared to material obtained via an IM process). For example, in a PM process, material may experience reduced segregation, especially as to sites such as grain boundaries.

As an example, a method can include blending powders from different alloys where, for example, an alloy may be age-hardenable or non-age-hardenable and/or degradable or non-degradable. As an example, an aluminum alloy may be selected from the 5000 series or from the 7000 series. As an example, a blend of powders can include particles with nanocrystalline grains. As an example, a blend of powder can include milled particles, for example, mechanically milled particles (e.g., consider cryomilling). As an example, a blend of powders can include one or more dispersoids.

As an example, a method can include tailoring dissolution of a component. For example, such a method may include blending powders of one or more non-degradable alloys with one or more degradable powders.

As an example, a method can include blending of water reactive or degradable powder with one or more other powders where the water reactive or degradable powder is in a range of about 5 percent to about 95 percent of the weight of a blend. In such an example, a powder may be an age-hardenable non-degradable powders (e.g., consider aluminum 6000 and 7000 series); may be a strain hardenable non-degradable powders (e.g., consider aluminum 5000 series, etc.); may be a powder that includes highly thermally stable nanocrystalline grains processed by cryomilling; may be a powder that includes highly thermally stable nanocrystalline grains processed by cryomilling that are further stabilized by dispersoids (e.g., SiC, $B_4C$, $Al_2O_3$, etc.), for example, to produce a metal matrix composite (MMC); etc.

As an example, a method can include blending water reactive or degradable powder with material that includes highly thermally stable nanocrystalline grains processed by cryomilling and optionally further blending dispersoids (e.g., SiC, $B_4C$, $Al_2O_3$, etc.).

FIG. 11 shows an example plot 1100 of component dimension versus time of degradation for various temperatures and an example of an assembly 1110 that includes components 1112, 1114 and 1115 that may be made by consolidating particulate materials and example degradable polymeric materials 1116 and 1118, which may optionally be included in an assembly such as, for example, the assembly 1110.

As indicated, degradation of a component may be determined by a physical characteristic of the component and an environmental condition such as, for example, temperature. For example, fluid at a temperature of about 120 degrees C. may cause a component to degrade more rapidly than fluid at a temperature of about 66 degrees C. As an example, a component may be constructed to include one or more layers where at least one layer includes a degradable material, which may include a dimension (e.g., thickness, etc.) that is based at least in part on information such as the information of the plot 1100 of FIG. 11. As an example, a layer may be a degradable polymeric material layer.

As an example, the assembly 1110 may include one component that degrades at a rate that differs from another component. For example, the plug component 1112 (e.g., a ball, etc.) may degrade more rapidly than the plug seat component 1114 (e.g., a ring that can include a plug seat and that may act to locate the plug seat). As shown in FIG. 11, the assembly 1110 can include a plurality of pieces where such pieces may be formed according to desired dissolution rate, strength and/or ductility.

As an example, equipment associated with one or more types of downhole operations can include one or more types of degradable polymeric materials. As mentioned, a liner may be a casing (e.g., a completion component). As mentioned, a liner may be installed via a liner hanger system. As an example, a liner hanger system may include various features such as, for example, one or more of the features of the assembly 1250 of FIG. 12.

Figure 12:
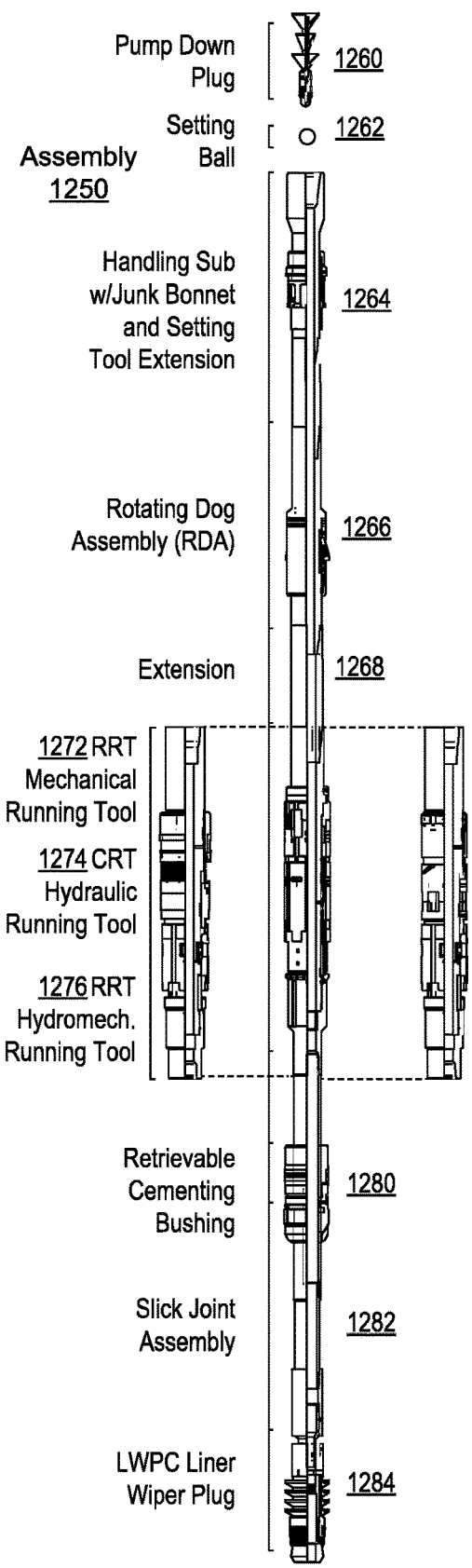
FIG. 12 illustrates examples of equipment.

As shown in FIG. 12, the assembly 1250 can include a pump down plug 1260, a setting ball 1262, a handling sub with a junk bonnet and setting tool extension 1264, a rotating dog assembly (RDA) 1266, an extension(s) 1268, a mechanical running tool 1272, a hydraulic running tool 1274, a hydromechanical running tool 1276, a retrievable cementing bushing 1280, a slick joint assembly 1282 and/or a liner wiper plug 1284.

As an example, a plug may be an object that can be seated, for example, to seal an opening. As an example, the pump down plug 1260 and the setting ball 1262 may be plugs. As an example, a plug tool may be a tool that includes at least one seat to seat a plug. For example, a plug tool may include a seat that can seat a plug shaped as a ball (e.g., a spherical plug), as a cylinder (e.g., a cylindrical plug), or other shaped plug.

As an example, an assembly may include a liner top packer with a polished bore receptacle (PBR), a coupling(s), a mechanical liner hanger, a hydraulic liner hanger, a hydraulic liner hanger, a liner(s), a landing collar with a ball seat, a landing collar without a ball seat, a float collar, a liner joint or joints and/or a float shoe and/or a reamer float shoe.

As an example, a method can include a liner hanger setting procedure. Such a procedure may include positioning a liner shoe at a depth at which a hanger is to be set, dropping a setting ball from a ball dropping sub of a cementing manifold, gravitating or pumping the ball down to a ball catch landing collar, reducing the pump rate when the ball is expected to seat, increasing pressure, which pressure may act through setting ports of a hanger body and set slips on to a casing, and while holding the hanger setting pressure, setting the liner hanger by slacking off the liner weight on the hanger slips, where a loss of weight may be indicated on a weight gauge as the liner hanger sets.

In the foregoing example, it may be desirable that the ball (see, e.g., the ball 1262) has properties suited for one or more operation or operations. Properties may include mechanical properties and may include one or more other types of properties (e.g., chemical, electrical, etc.). As an example, it may be desirable that the ball degrades. For example, a ball may be manufactured with properties such that the ball degrades when exposed to one or more conditions (e.g., consider environmentally-assisted cracking). In such an example, where the ball acts to block a passage, upon degradation, the passage may become unblocked. As an example, a ball or other component (e.g., a plug, etc.) may degrade in a manner that facilitates one or more operations.

As an example, one or more seals may be made at least in part of a degradable polymeric material. For example, consider a seat that may be coated with a degradable polymeric material that can, prior to degradation, facilitate sealing of a plug that can be seated in the seat. As an example, a plug may be coated with a degradable polymeric material. As an example, a plug may be coated with a degradable polymeric material and a seat that can seat the plug may be coated with a degradable polymeric material.

As an example, a component or a portion of a component may degrade in stages. For example, consider a plug that degrades from a first size to a second smaller size. In such an example, the second smaller size may allow the plug to move (e.g., from a first seat to a second seat, etc.). As an example, a plug tool may be a degradable tool. As an example, a plug tool may be degradable in part (e.g., consider a frangible degradable plug). For example, consider a plug tool with a degradable seat or degradable seats. In such an example, a plug may be seated in a degradable seat that upon degradation of the seat, the plug may pass through the seat (e.g., become unplugged with respect to that seat). As an example, a system can include a plug tool that is degradable at least in part and one or more degradable plugs (e.g., balls, cylinders, etc.). As an example, a layer of a plug, a seat, etc., may be a degradable polymeric material layer.

Figure 13:
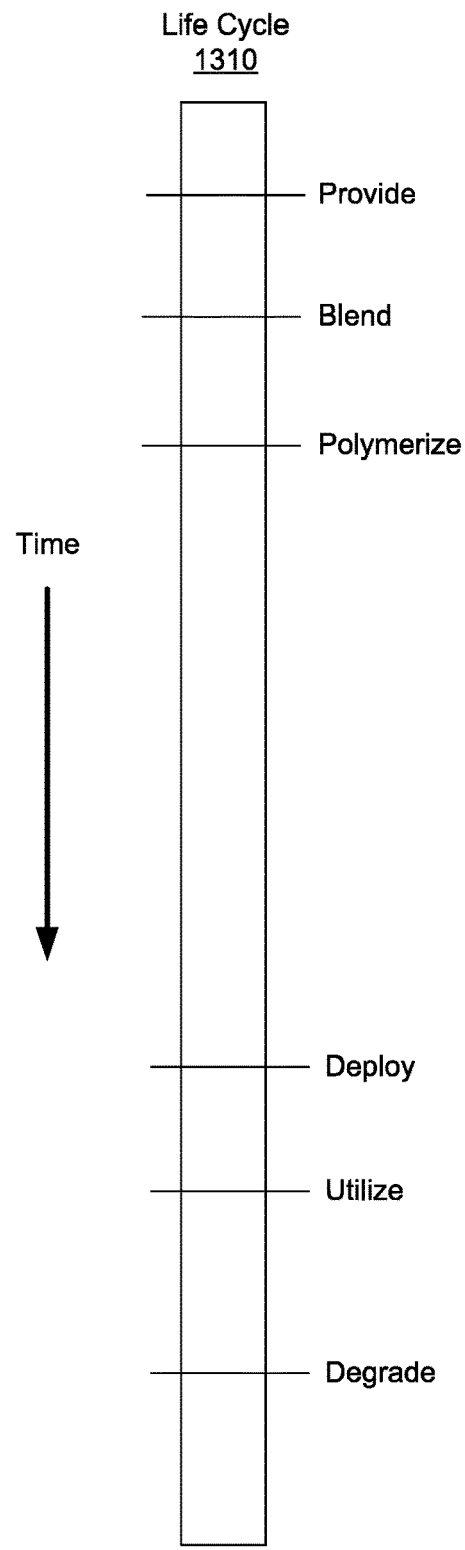
FIG. 13 illustrates an example of a life cycle.

FIG. 13 shows an example of a life cycle 1310. In the life cycle 1310, various times are illustrated as to stages or phases. For example, one or more materials may be provided, a blend may optionally be made of multiple materials, and a blend may be polymerized via one or more processes. As an example, a finished component may be deployed, utilized and then degraded.

As an example, a component may be formed of material that provides a desired degradation rate and desired mechanical properties (e.g., strength, elasticity, etc.). As an example, a degradation rate may depend upon one or more conditions (e.g., temperature, pressure, fluid environments), which may be exist in an environment and/or may be achieved in an environment (e.g., via one or more types of intervention).

As an example, a degradable material may be suitable for use in an operation that may include stages. For example, consider a cementing operation, a fracturing operation, etc. As explained, a process may be associated with a completion where portions of the completion are constructed, managed, altered, etc. in one or more stages. For example, cementing may occur in stages that extend successively deeper into a drilled borehole and, for example, fracturing may occur in stages.

As an example, a method can include subjecting a material or materials to severe plastic deformation (SPD), for example, resulting in a high defect density and equiaxed ultrafine grain (UFG) sizes (e.g., with a dimension less than about 500 nm or, for example, less than about 300 nm) and/or nanocrystalline (NC) structures (e.g., with a dimension less than about 100 nm).

As an example, a degradable polymeric material may be used, for example, as a component or as a portion of a component in a stage or stages of a fracturing operation. As an example, such a material may be used as a component or as a portion of a component in a tensile-loaded application, for example, consider a bridge plug, etc. As an example, a bridge plug may be a tool, for example, a bridge plug tool. Such a tool may include one or more seats, which may, for example, provide for seating of one or more plugs. A component can include one or more seal elements, one or more surface coatings, etc., which may be elastomeric and degradable.

As an example, a process material may be formed as part of a cable. As an example, consider a degradable cable where degradable alloy forms a conductor and degradable polymeric material forms insulation.

As an example, a component formed from processed material may be a bridge plug. A bridge plug may be a downhole tool (e.g., a type of plug tool) that can be located and set to isolate a lower part of a wellbore. As an example, a bridge plug may be permanent, degradable, retrievable, etc. As an example, a bridge plug may be tailored to enable a lower wellbore to be permanently sealed from production or temporarily isolated, for example, from a treatment conducted on an upper zone.

A part, a component, etc. constructed of a processed material or processed materials may include be a fluid sampling bottle, a pressure housing, a pump shaft, a cable (e.g., wireline, a power cable, etc.), a bridge plug tool, a projectile (e.g., a drop ball, a dart, etc.), a drill stem stabilizer, etc.

As an example, a method can include making a centralizer using processed material. For example, a centralizer may exhibit enhanced wear resistance that can reduce surface damage and corrosion fatigue on a borehole assembly (e.g., BHA), for example, thereby increasing BHA lifetime. As an example, via improved abrasion wear resistance of a centralizer, reliability may be improved, for example, when drilling over extended deviated lengths.

As an example, a borehole tool may be a tool that is part of a borehole assembly (e.g., "BHA") or borehole system. As an example, a BHA may be a lower portion of the drillstring, including (e.g., from a bottom up in a vertical well) a bit, a bit sub, optionally a mud motor, stabilizers, a drill collar, a heavy-weight drillpipe, a jarring devices (e.g., jars) and crossovers for various threadforms. As BHA may provide force for a bit to break rock (e.g., weight on bit), survive a hostile mechanical environment and provide a driller with directional control of a borehole. As an example, an assembly may include one or more of a mud motor, directional drilling and measuring equipment, measurements-while-drilling tools, logging-while-drilling tools or other borehole tools.

As an example, an apparatus can include a shape and material that includes an aluminum alloy that has an average grain size less than about 1 micron or, for example, less than about 500 nanometers. In such an example, the apparatus may be a degradable apparatus. As an example, such an apparatus may be a degradable plug. In such an example, the degradable plug may include aluminum and gallium and, for example, indium.

As an example, a borehole tool may be a tool such as, for example, a tool operable in a downhole operation. For example, consider a plug as a tool, a plug tool, a centralizer, a sampling bottle, a wireline, a slickline, etc. As an example, one or more tools can include a degradable elastomeric material such as, for example, a seal element, a coating, etc.

As an example, an alloy may include one or more of the following group 13 elements: aluminum, gallium and indium. As an example, an alloy may include at least one of the following group 2 elements: magnesium and calcium.

As an example, a method can include providing particulate material that includes an aluminum alloy where the aluminum alloy is at least approximately eighty percent by weight of the first particulate material and that includes one or more metals selected from a group of alkali metals, alkaline earth metals, group 12 transition metals, and basic metals having an atomic number equal to or greater than 31, where the one or more metals selected from the group total at least approximately two percent by weight of the particulate material. Such a particulate material may optionally be blended with one or more other particulate materials. For example, consider blending with a second particulate material that includes at least one aluminum alloy selected from a group of series 2000, 5000, 6000, 7000, and 9000.

As an example, a particulate material can include at least one basic metal having an atomic number equal to or greater than 31 where, for example, the at least one basic metal having an atomic number equal to or greater than 31 is at least approximately two percent by weight of the particulate material.

As an example, particulate material can include gallium (e.g., as a basic metal). In such an example, the gallium can be at least approximately two percent by weight of the particulate material. In such an example, the presence of gallium may make the particulate material a degradable material (e.g., degradable in an aqueous environment). For example, gallium may coat grains (e.g., as grain boundary material). As an example, a particulate material can include indium. As an example, a particulate material can include gallium and/or indium, which may be present, for example, at at least approximately two percent by weight of the particulate material.

As an example, a particulate material can include at least one group 12 transition metal selected from a group of zinc and mercury. As an example, a particulate material can include at least one of gallium, indium, tin, bismuth, zinc, mercury, lithium, sodium and potassium.

Hydroxide—

As an example, a degradable polymeric material can include a silicone rubber and a material that can form hydroxide upon exposure to water. As an example, a degradable polymeric material can include a thermoplastic elastomer and a material that can form hydroxide upon exposure to water. As an example, a degradable polymeric material can include a nitrile rubber and a material that can form hydroxide upon exposure to water. As an example, a degradable polymeric material can include an ethylene propylene diene monomer (M-class) rubber (EPDM rubber) and a material that can form hydroxide upon exposure to water. As an example, a degradable polymeric material can include a polychloroprene and a material that can form hydroxide upon exposure to water. A polychloroprene can be one or more members of a family of synthetic rubbers formed at least in part via polymerization of chloroprene. As an example, a degradable polymeric material can include a viton rubber and a material that can form hydroxide upon exposure to water.

A degradable alloy (e.g., aluminum or other metal-based alloy) may be provided as a powder and mixed into a flowable polymeric material. In such an example, vulcanization may occur according to, for example, a temperature and time profile. As an example, a degradable elastomeric material may be formed in a mold. In such an example, heating and pressure may be applied where curing occurs (e.g., chain cross-linking, etc.). As an example, one or more additives may be provided that can adjust one or more rheological properties of a blend of materials, for example, to facilitate processing.

As an example, a washer may be formed of a degradable polymeric material. As an example, a degradable polymeric material may be coated onto an object, for example, to form a cover.

As an example, packing of powder within a polymeric matrix to form a degradable polymeric material. In such an example, the powder can include a water reactive material. As an example, a powder can be characterized by particle size and/or sphericity. As an example, packing may be controlled via one or more of particle size and sphericity. As an example, a powder may be screened to form populations of particles, which may be utilized to tailor a degradable polymeric material. As an example, a packing model may be utilized to tailor a degradable polymeric material, for example, consider a packing model that considers packing of spherical particles. As an example, a polymeric matrix can be a relatively contiguous phase that supports particles where the particles include water reactive material, which upon exposure to water, generate hydroxide that can cause degradation of the polymeric matrix (see, e.g., the plots 652 and 654 of FIG. 6). As an example, a method can include mixing powder with a flowable polymeric material to achieve a desired level of wetting of particles of the powder.

As an example, a method can include selecting a particle size of a powder with a particle shape where such powder can be included in a polymeric matrix at a relatively high percentage. In such an example, the polymeric matrix may be relatively contiguous (e.g., a network) with branches that are supportive yet of minimal size. As an example, a relatively uniform blend may be formed that includes water reactive particles where such a blend is then cured to form a degradable polymeric material.

As an example, a degradable polymeric material can be exposed to water where particles within the material react to generate heat and hydrogen where egress of the hydrogen out of the material disrupts a polymeric matrix of the material. In such an example, liberation of hydrogen can thereby degrade the material.

To Insert Claims Here

As an example, a method can include polymerizing a blend of materials where the materials include polymeric material and a degradable alloy material; and forming a degradable component from the polymerized blend of materials. Such a method can include exposing the degradable component to water where the degradable alloy material reacts with the water to at least in part degrade the component.

As an example, degradable alloy material can include aluminum and one or more metals selected from a group consisting of alkali metals, alkaline earth metals, group 12 transition metals, and basic metals having an atomic number equal to or greater than 31.

As an example, a polymeric material can include one or more of nitrile rubber and silicone.

As an example, a degradable component can be a seal element, for example, consider an O-ring.

As an example, one or more metals selected from a group of alkali metals, alkaline earth metals, group 12 transition metals, and basic metals having an atomic number equal to or greater than 31 can include at least one basic metal having an atomic number equal to or greater than 31. In such an example, the at least one basic metal having an atomic number equal to or greater than 31 can be at least approximately two percent by weight of a degradable alloy material.

As an example, one or more metals selected from a group of alkali metals, alkaline earth metals, group 12 transition metals, and basic metals having an atomic number equal to or greater than 31 can include gallium where, for example, the gallium is at least approximately two percent by weight of a degradable alloy material.

As an example, one or more metals selected from a group of alkali metals, alkaline earth metals, group 12 transition metals, and basic metals having an atomic number equal to or greater than 31 can include indium.

As an example, one or more metals selected from a group of alkali metals, alkaline earth metals, group 12 transition metals, and basic metals having an atomic number equal to or greater than 31 can include at least one member selected from a group consisting of gallium, indium, tin, bismuth, zinc, mercury, lithium, sodium and potassium.

As an example, a degradable component, which is made at least in part of a degradable polymeric material, can be degradable in an aqueous environment.

As an example, a degradable alloy material, which is within a polymeric matrix to form a degradable polymeric material, can include grain material that includes an aluminum alloy and grain boundary material.

As an example, a degradable component can be at least a portion of a borehole tool. As an example, a method can include degrading such a degradable component in a borehole.

As an example, a degradable alloy material can include substantially spherical particles. Such particles can be included within a polymeric matrix to form a degradable polymeric material.

As an example, a degradable alloy material can include gas atomized particles, for example, formed via a gas atomization process where a melt is passed through a nozzle or nozzles. In such an example, the process may be performed in a substantially inert gas environment (e.g., inert gas atomization, IGA).

As an example, a method can include polymerizing a blend of materials where the materials include polymeric material and a degradable alloy material; and forming a degradable component from the polymerized blend of materials. In such an example, the degradable alloy material can be included at a weight percent greater than about 30 percent.

As an example, a method can include polymerizing a blend of materials where the materials include polymeric material and a degradable alloy material; and forming a degradable component from the polymerized blend of materials. In such an example, the degradable alloy material can be included at a weight percent greater than about 50 percent.

As an example, a method can include polymerizing a blend of materials where the materials include polymeric material and a degradable alloy material; and forming a degradable component from the polymerized blend of materials. In such an example, the degradable alloy material can be included at a weight percent greater than about 70 percent.

As an example, a method can include polymerizing a blend of materials where the materials include polymeric material and a degradable alloy material; and forming a degradable component from the polymerized blend of materials. In such an example, the degradable alloy material can be included with a packing fraction of at least 0.3.

As an example, a method can include polymerizing a blend of materials where the materials include polymeric material and a degradable alloy material; and forming a degradable component from the polymerized blend of materials. In such an example, the degradable alloy material can include particles that can be characterized by a multimodal particle size distribution.

As an example, a degradable elastomeric material can include a polymeric matrix; and degradable alloy particles. In such an example, the material can be one or more of a seal element, a coating and a portion of a borehole tool.

As an example, a degradable elastomeric material can include a polymeric matrix; and degradable alloy particles where the degradable alloy particles include substantially spherical particles. As an example, such particles may be or include gas atomized particles.

As an example, a degradable elastomeric material can include a polymeric matrix; and degradable alloy particles where the degradable alloy particles are included at a weight percent greater than about 30 percent.

As an example, a degradable elastomeric material can include a polymeric matrix; and degradable alloy particles where the degradable alloy particles are included at a weight percent greater than about 50 percent.

As an example, a degradable elastomeric material can include a polymeric matrix; and degradable alloy particles where the degradable alloy particles are included at a weight percent greater than about 70 percent.

As an example, a degradable elastomeric material can include a polymeric matrix; and degradable alloy particles where the degradable alloy particles are included with a packing fraction of at least 0.3.

As an example, a degradable elastomeric material can include a polymeric matrix; and degradable alloy particles where the degradable alloy particles can be characterized by a multimodal particle size distribution.

As an example, a degradable polymeric material, which can be a degradable elastomeric material, can be formed into a component that has a limited lifetime of use. In such an example, the component may be exposed to one or more cycles during the lifetime before the component is degraded (e.g., dissolved, etc.). As such a component may include a relatively large weight percent of water reactive alloy particles, the behavior of the component (e.g., with respect to time) may differ from a component made of polymeric material without the water reactive alloy particles. However, where time of use is relatively short, as may be associated with a downhole borehole operation, behavior over an initial period of time may be relatively similar to the polymeric material without the water reactive alloy and therefore, for example, modeled using information for the polymeric material.

As an example, introduction of water reactive alloy particles below a particular size and with sufficient sphericity into a polymeric material may exhibit relatively insubstantial differences of the composite material, thereby formed, when compared to the polymeric material without the water reactive alloy particles. Thus, such an approach can allow for tailoring dissolution (e.g., degradability) of a polymeric material via use of water reactive particles while having an expectation that the polymeric material will behave relatively similar as if water reactive particles were not present (see, e.g., the plots 610 and 630 of FIG. 6).

As an example, a method can include forming a degradable polymeric material by mixing polymeric material and a water reactive material where the degradable polymeric material exhibits a higher density than the polymeric material without the water reactive material where elastomeric properties are relatively similar (e.g., when not exposed to water; see, e.g., the plots 610 and 630 of FIG. 6). For example, the Young's modulus may be similar with and without the water reactive material. As an example, for a silicon rubber the density may be about 1.42 g/cc without water reactive particles and about 1.8 g/cc with about 45 percent water reactive particles by weight; however, the Young's modulus may be relatively similar and, for example, suitable to perform a particular function or functions.

As an example, a water reactive polymeric material can be an elastomeric that breaks down in aqueous fluids (e.g., dissolves and disintegrates into powder form). Such a material may be tailored via composition and processing to exhibit a desired strength and elongation to failure in one or more environments (e.g., ambient to high pressures) where such a material may be formed into a seal to perform a sealing function. As an example, reactivity of such a material can be tailored by addition of one or more types of catalytic materials (e.g., metallic powder forms with distinct particle size distributions, etc.). As an example, a water reactive polymeric material may be utilized in one or more temporary sealing solutions (e.g., static and/or dynamic), for example, from multistage stimulation elastomeric sealing elements to triggering devices.

As an example, a water reactive polymeric material may be tuned to degrade in brine (e.g., dilute to saturated) and water (e.g., from ambient to HPHT). As an example, a target duration to breakdown and dissolution may be selected to be of the order of hours, of the order of days, of the order of weeks, or the order of months.

As an example, one or more methods described herein may include associated computer-readable storage media (CRM) blocks. Such blocks can include instructions suitable for execution by one or more processors (or cores) to instruct a computing device or system to perform one or more actions. As an example, equipment may include a processor (e.g., a microcontroller, etc.) and memory as a storage device for storing processor-executable instructions. In such an example, execution of the instructions may, in part, cause the equipment to perform one or more actions (e.g., consider a controller to control processing such as ECAP, cryomilling, extruding, machining, forming, cementing, fracturing, etc.). As an example, a computer-readable storage medium may be non-transitory and not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 14:
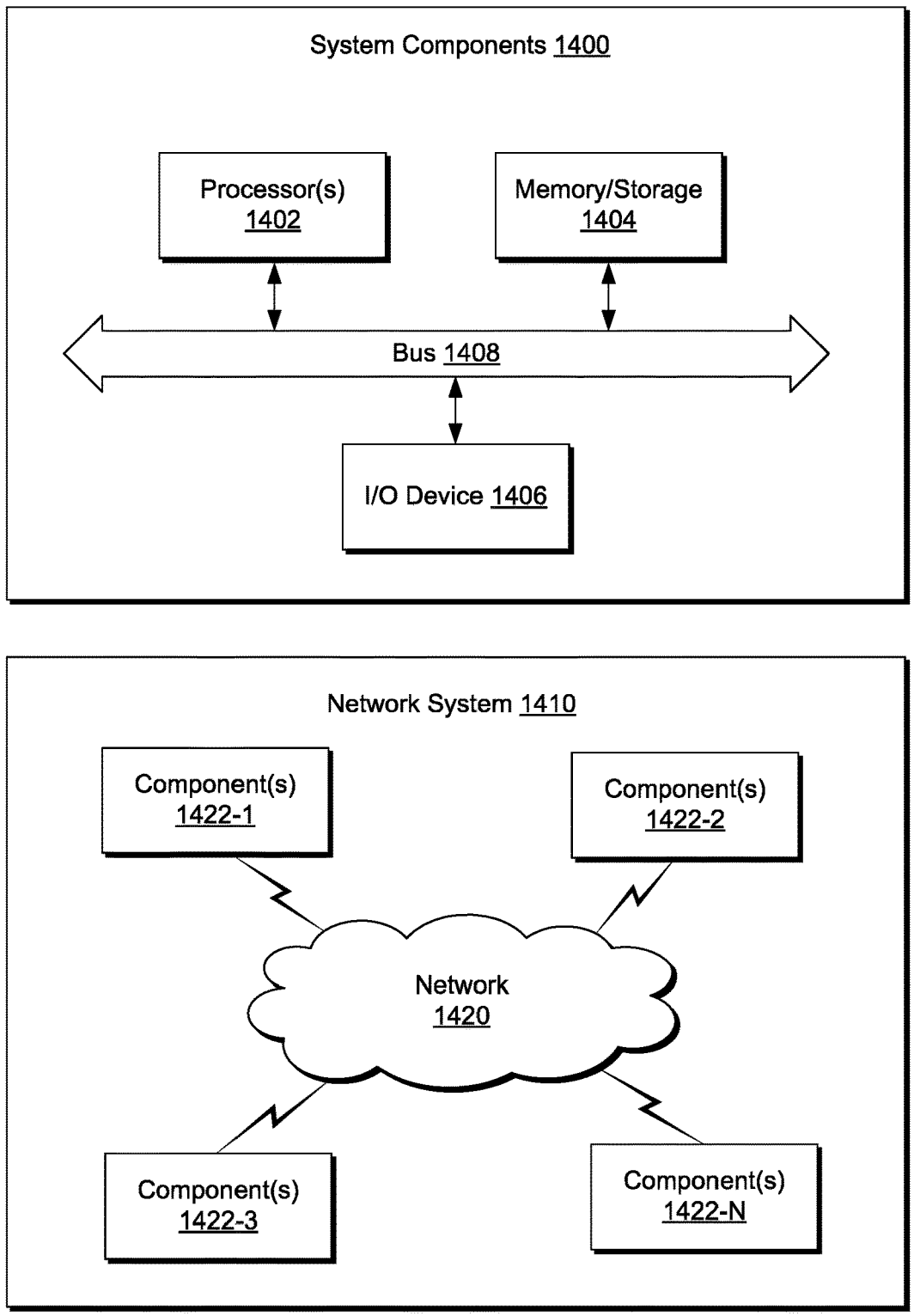
FIG. 14 illustrates example components of a system and a networked system.

FIG. 14 shows components of a computing system 1400 and a networked system 1410. The system 1400 includes one or more processors 1402, memory and/or storage components 1404, one or more input and/or output devices 1406 and a bus 1408. According to an embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. As an example, instructions may be stored as one or more modules. As an example, one or more processors may execute instructions to implement (wholly or in part) one or more attributes (e.g., as part of a method). A user may view output from and interact with a process via an I/O device (e.g., the device 1406). According to an embodiment, a computer-readable medium may be a storage component such as a physical memory storage device, for example, a chip, a chip on a package, a memory card, etc.

According to an embodiment, components may be distributed, such as in the network system 1410. The network system 1410 includes components 1422-1, 1422-2, 1422-3, . . . , 1422-N. For example, the components 1422-1 may include the processor(s) 1402 while the component(s) 1422-3 may include memory accessible by the processor(s) 1402. Further, the component(s) 1402-2 may include an I/O device for display and optionally interaction with a method. The network may be or include the Internet, an intranet, a cellular network, a satellite network, etc.

CONCLUSION

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   polymerizing a blend of materials wherein the materials comprise polymeric material and a degradable alloy material; and
   forming a degradable component from the polymerized blend of materials,
   wherein the degradable alloy material comprises grain material that comprises an aluminum alloy and grain boundary material.

2. The method of claim 1 wherein the degradable alloy material comprises aluminum and one or more metals selected from a group consisting of alkali metals, alkaline earth metals, group 12 transition metals, and basic metals having an atomic number equal to or greater than 31.

3. The method of claim 1 wherein the polymeric material comprises nitrile rubber.

4. The method of claim 1 wherein the polymeric material comprises silicone.

5. The method of claim 1 wherein the degradable component comprises a seal element.

6. The method of claim 5 wherein the seal element comprises an O-ring.

7. The method of claim 2 wherein the one or more metals selected from the group comprises at least one basic metal having an atomic number equal to or greater than 31, the basic metal comprising at least approximately two percent by weight of the degradable alloy material.

8. The method of claim 2 wherein the one or more metals selected from the group comprises gallium, the gallium comprising at least approximately two percent by weight of the degradable alloy material.

9. The method of claim 2 wherein the one or more metals selected from the group comprises indium.

10. The method of claim 2 wherein the one or more metals selected from the group comprises at least one member selected from a group consisting of gallium, indium, tin, bismuth, zinc, mercury, lithium, sodium and potassium.

11. The method of claim 1 wherein the degradable component is degradable in an aqueous environment.

12. The method of claim 1 wherein the degradable component comprises at least a portion of a borehole tool, the method further comprising degrading the degradable component in a borehole.

13. The method of claim 1 wherein the degradable alloy material comprises substantially spherical particles.

14. The method of claim 1 wherein the degradable alloy material comprises gas atomized particles.

15. The method of claim 1 wherein the degradable alloy material comprises a weight percent greater than about 30 percent.

16. The method of claim 1 wherein the degradable alloy material comprises a weight percent greater than about 50 percent.

17. The method of claim 1 wherein the degradable alloy material comprises a weight percent greater than about 70 percent.

18. The method of claim 1 wherein the degradable alloy material comprises a packing fraction of at least 0.3.

19. The method of claim 1 wherein the degradable alloy material comprises particles that comprise a multimodal particle size distribution.

20. A method comprising:
    polymerizing a blend of materials wherein the materials comprise polymeric material and a degradable material; and
    forming a degradable component from the polymerized blend of materials,
    wherein the degradable alloy material comprises gas atomized particles.

\* \* \* \* \*